United States Patent [19]

Kasai et al.

[11] Patent Number: 4,837,600

[45] Date of Patent: Jun. 6, 1989

[54] RECORDING APPARATUS

[75] Inventors: Toshihiro Kasai; Naoaki Ide, both of Yokohama, Japan

[73] Assignee: Kabushiki Kaisha Toshiba, Kawasaki, Japan

[21] Appl. No.: 105,828

[22] Filed: Oct. 8, 1987

[30] Foreign Application Priority Data

Oct. 24, 1986 [JP] Japan ................................ 61-252874

[51] Int. Cl.[4] ........................ G03G 15/00; H04N 1/00

[52] U.S. Cl. .................................... 355/208; 355/219; 430/31

[58] Field of Search ....... 355/4, 3 DD, 14 D, 14 CH, 355/14 R; 430/31, 42, 902, 30; 346/157, 160

[56] References Cited

U.S. PATENT DOCUMENTS 4,026,643 5/1977 Bergman ......................... 355/3 DD
4,408,871 10/1983 Kojima ....................... 355/14 CHY
4,611,901 9/1986 Kohyama et al. ...................... 355/4
4,693,593 9/1987 Gerger ........................... 355/14 CH

FOREIGN PATENT DOCUMENTS 59-79264 5/1984 Japan ...................................... 355/4
60-203968 10/1985 Japan ............................. 355/14 CH

OTHER PUBLICATIONS

Scharfe, *Electrophotography Principles and Optimization*, Xerox Corporation, Research Studies, Press Ltd., N.Y., Chapter 4, pp. 97-105.

*Primary Examiner*—Arthur T. Grimley
*Assistant Examiner*—J. Pendegrass
*Attorney, Agent, or Firm*—Foley & Lardner, Schwartz, Jeffery, Schwaab, Mack, Blumenthal & Evans

[57] ABSTRACT

A recording apparatus having a photosensitive body, a charger for charging the photosensitive body, an exposure unit for forming a latent image on the photosensitive body charged by the charger, and a developing unit for developing the latent image into a visible image on the photosensitive body. The recording apparatus also includes a first surface potential sensor for measuring the surface potential of the photosensitive body before the latent image has been developed by the developing unit, a second surface potential sensor for measuring the surface potential of the photosensitive body after the latent image has been developed by the developing unit, a computer for computing the surface potential of the photosensitive body at a position between the first and second surface potential sensors to estimate the surface potential at the position of the developing unit, and a controller for controlling the charger so that the estimated surface potential becomes a determined level.

14 Claims, 38 Drawing Sheets

| ADDRESS | CONTENT | |
|---|---|---|
| 4000<br>4001 | FIRST COLOR TOP MARGIN TABLE | |
| 4002<br>4003 | SECOND COLOR TOP MARGIN TABLE | |
| 4004<br>4005 | LEFT MARGIN TABLE | |
| 4006<br>4007 | A3 | BOTTOM MARGIN TABLE |
| 4008<br>4009 | | RIGHT MARGIN TABLE |
| | | |
| 4080<br>4081 | A6 | BOTTOM MARGIN TABLE |
| 4082<br>4083 | | RIGHT MARGIN TABLE |
| 4090<br>~ | TOP MARGIN COARSE ADJUSTMENT TABLE | SWITCH 1<br>2<br>~<br>N |
| 40B0<br>~ | TOP MARGIN FINE ADJUSTMENT TABLE | SWITCH 1<br>2<br>~<br>N |
| 40D0<br>~ | LEFT MARGIN COARSE ADJUSTMENT TABLE | SWITCH 1<br>2<br>~<br>N |
| 4100<br>~ | LEFT MARGIN FINE ADJUSTMENT TABLE | SWITCH 1<br>2<br>~<br>N |
| 4120<br>~ | Z BEAM SCAN TABLE | SWITCH 1<br>2<br>~<br>N |

FIG. 10A.

| ADDRESS | CONTENT | |
|---|---|---|
| 6000 6001 | RED TONER | FIRST DEVELOPING BIAS TABLE |
| 6002 6003 | | SECOND DEVELOPING BIAS TABLE |
| 6004 6005 | BLUE TONER | FIRST DEVELOPING BIAS TABLE |
| 6006 6007 | | SECOND DEVELOPING BIAS TABLE |
| 6008 6009 | GREEN TONER | FIRST DEVELOPING BIAS TABLE |
| 600A 600B | | SECOND DEVELOPING BIAS TABLE |
| 600C 600D | BLACK TONER | FIRST DEVELOPING BIAS TABLE |
| 600E 600F | | SECOND DEVELOPING BIAS TABLE |
| | | |
| 6100 6101 | FIRST CHARGING POTENTIAL CONTROL | SURFACE POTENTIAL TABLE |
| 6102 6103 | | ERROR IN CONVERGING |
| 6104 6105 | | FIRST TIME CONTROL OUTPUT |
| 6106 6107 | | MINIMUM CORRECTION |
| 6108 6109 | | SURFACE POTENTIAL LIMIT |
| 610A 610B | | CONTROL OUTPUT UPPER LIMIT |
| 610C 610D | | CONTROL OUTPUT LOWER LIMIT |
| 610E 610F | SECOND CHARGING POTENTIAL CONTROL | SURFACE POTENTIAL TABLE |
| 6110 6111 | | ERROR IN CONVERGING |
| 6112 6113 | | FIRST TIME CONTROL OUTPUT |
| 6114 6115 | | MINIMUM CORRECTION |
| 6116 6117 | | SURFACE POTENTIAL LIMIT |
| 6118 6119 | | CONTROL OUTPUT UPPER LIMIT |
| 611A 611B | | CONTROL OUTPUT LOWER LIMIT |
| | | |
| 6120 ~ | TEMPERATURE CORRECTION CHARGING POTENTIAL | 40C CORRECTION TABLE ~ 10C CORRECTION TABLE |

FIG. 10B.

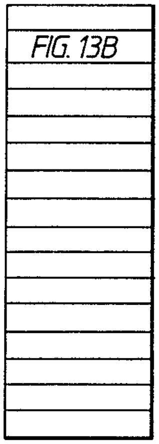
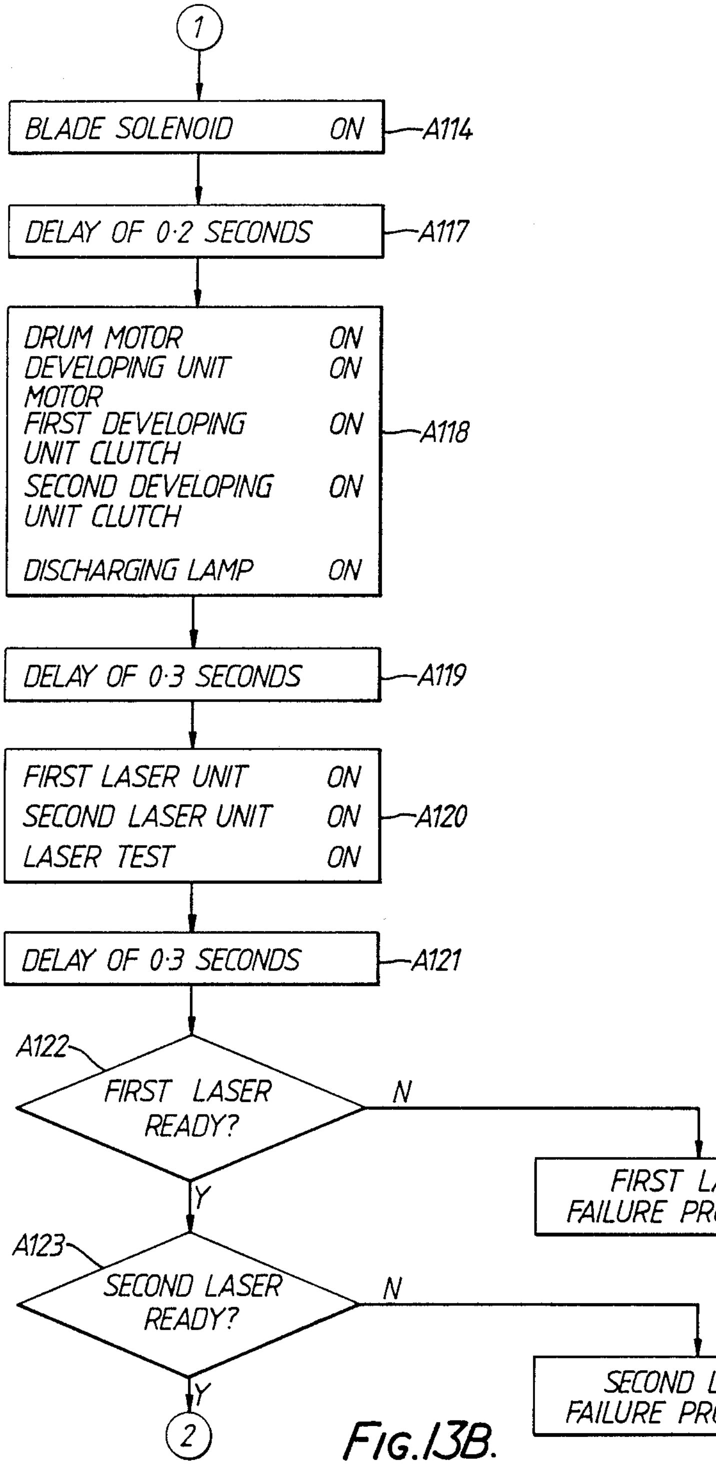
FIG. 13B.

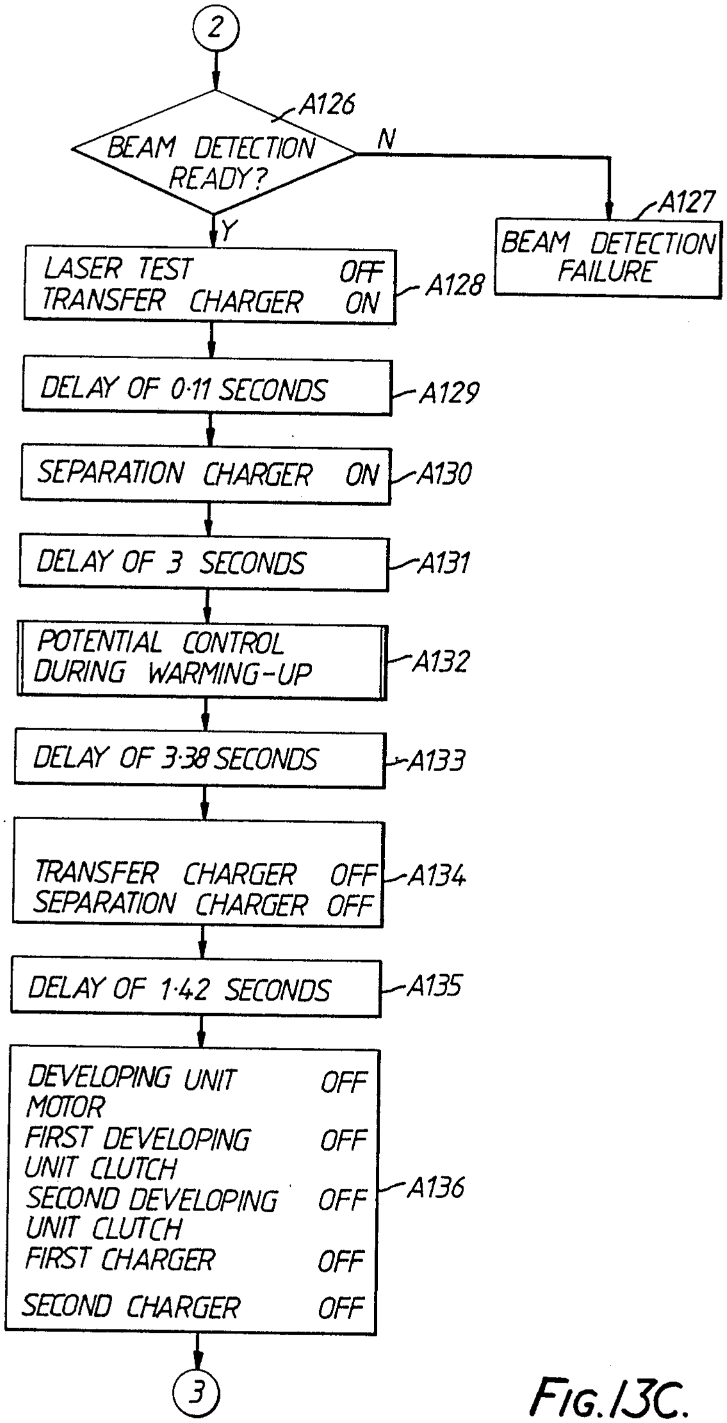
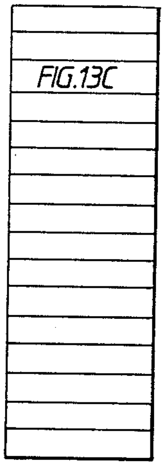
FIG. 13C.

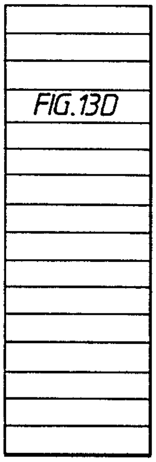
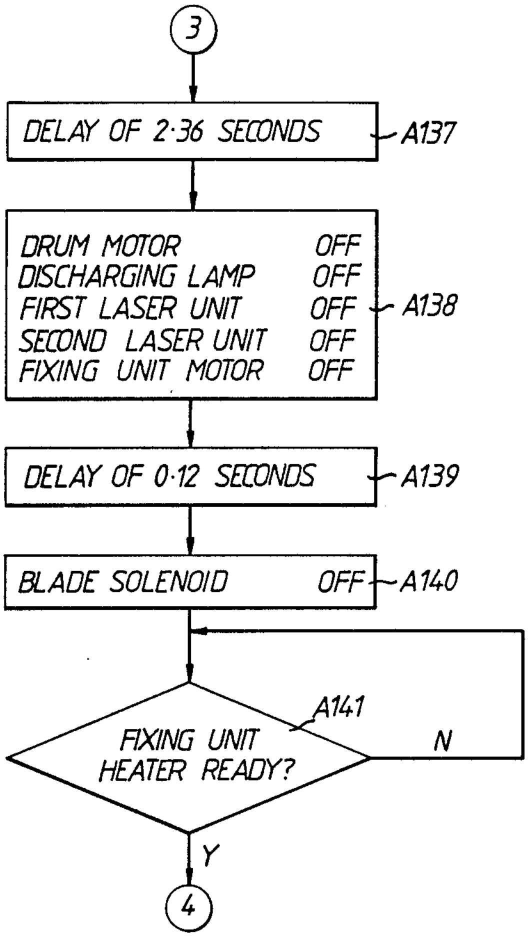
FIG. 13D.

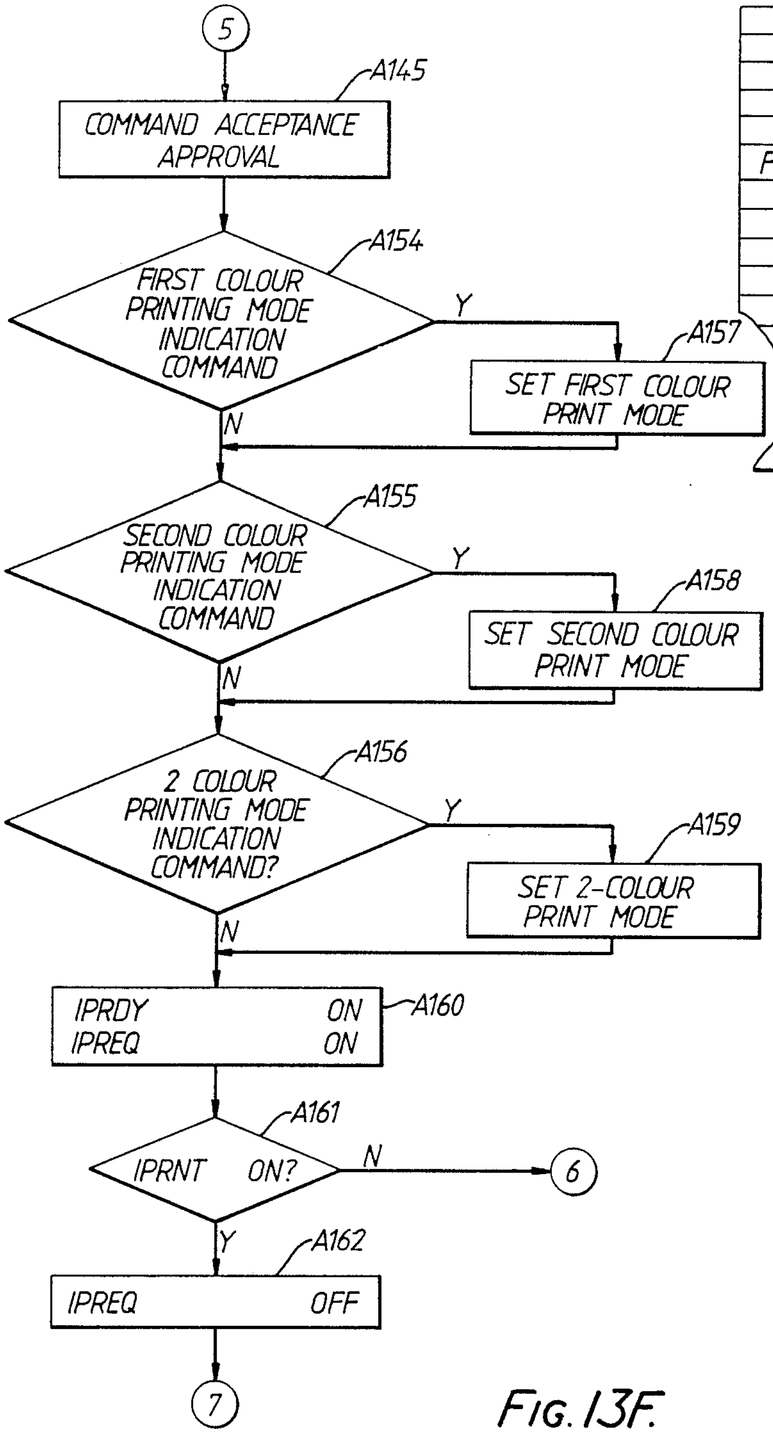
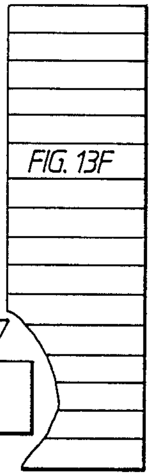
FIG. 13F.

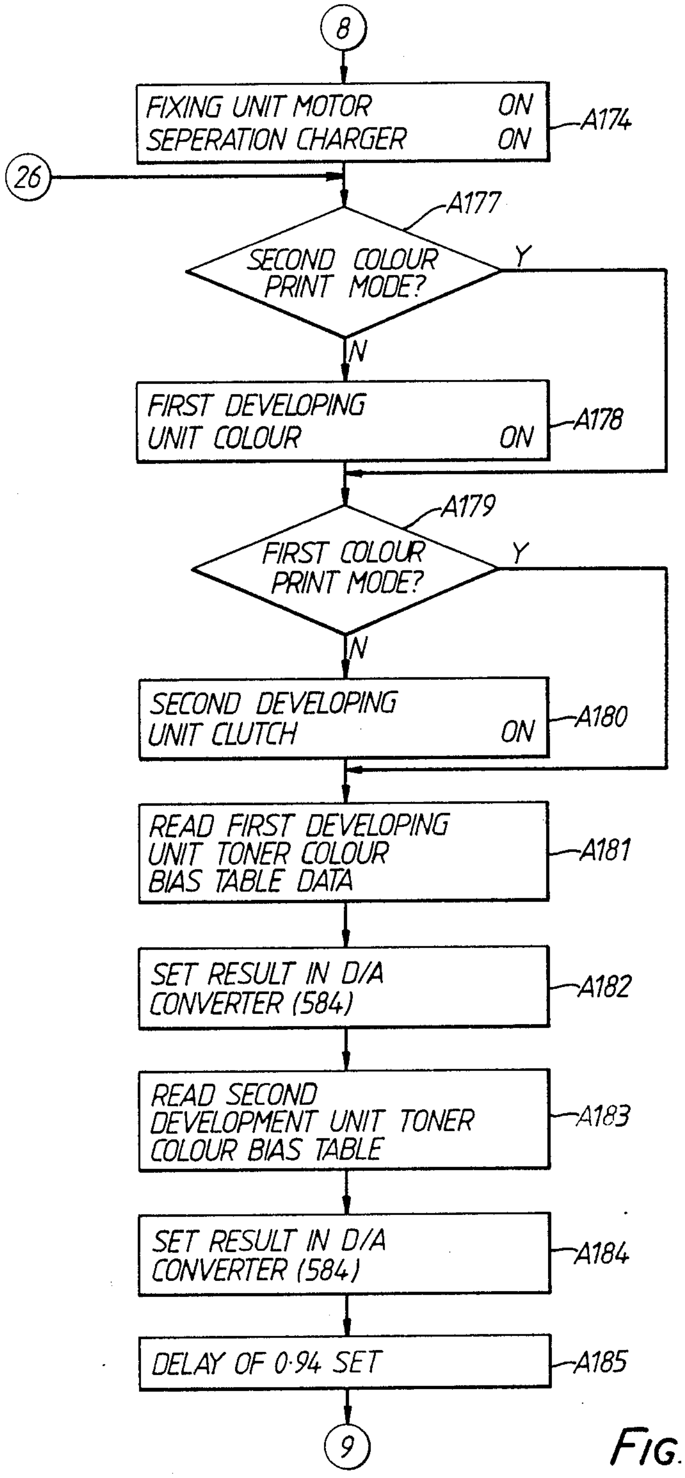
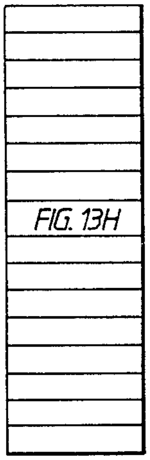
FIG. 13H.

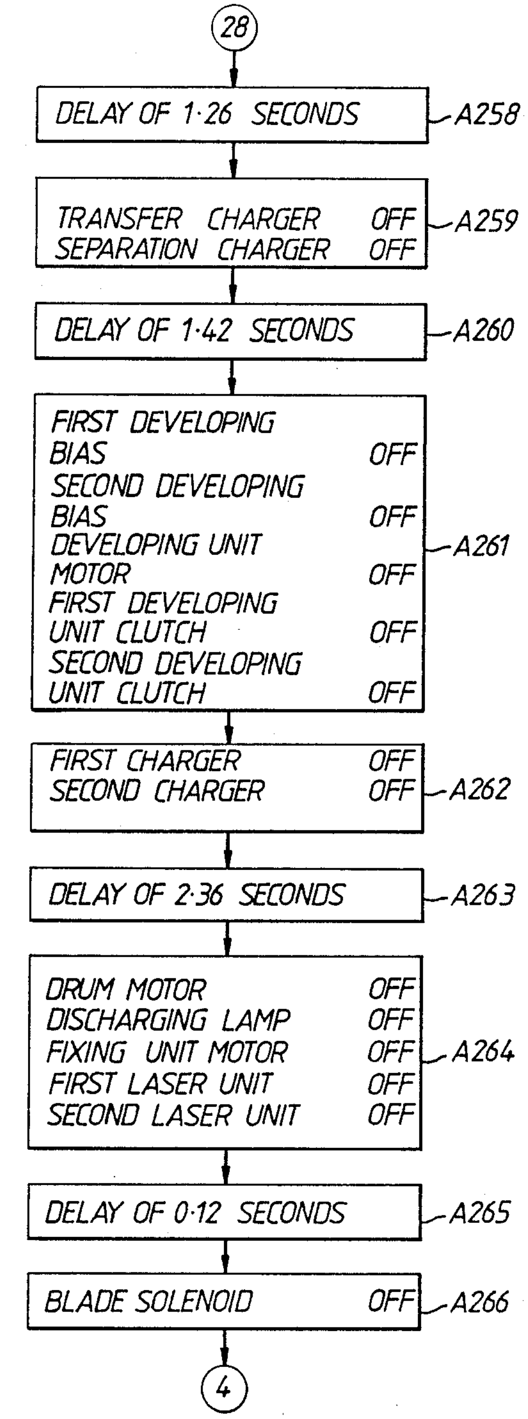
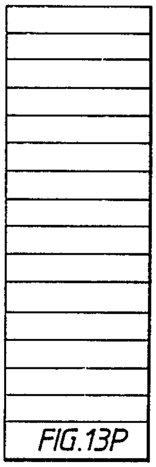
FIG. 13P.

RECORDING APPARATUS

BACKGROUND OF THE INVENTION

1. Field of the Invention

This invention relates to a recording apparatus which includes a process of forming electrostatic latent images on a charged photosensitive body by scanning with, for instance, laser beams and developing the electrostatic latent images. More particularly, the invention relates to a recording apparatus which is capable of recording multi-colored information on the photosensitive body with a plurality of laser beams.

2. Description of the Related Art

Recently, so called multi-color image laser beam printers have been developed which have a plurality of printing processes using scanning exposure, for instance with laser beams, and electrophotographic processes. This type of multi-color image laser beam printer is provided, for example, with a drum-shaped photosensitive body 20, as shown in FIG. 1. Around the circumference of photosensitive body 20 are arranged in sequence a first charger 21, a first exposure section 22, a first developing unit 23, a second charger 24, a second exposure section 25, a second developing unit 26, a transfer charger 27, a separation charger 28, a cleaner 29 and a discharging lamp 30. One process is completed by the following operations. Photosensitive body 20 is evenly charged by first charger 21. A first electrostatic latent image is formed at first exposure section 22. The first color is made visible by first developing unit 23. Photosensitive body 20 is recharged by second charger 24. A second electrostatic latent image is formed at second exposure section 25. The second color is made visible by second developing unit 26. Although it is not shown, if required, a control process is performed to make the charge polarities of the two color toners uniform. A two-color visible image is transferred onto a paper sheet 31 by transfer charger 27. After transferring, any toner remaining on photosensitive body 20 is cleaned off by cleaner 29. The remaining electrostatic latent image on photosenisitive body 20 is eliminated by discharging lamp 30.

However, the surface potentials of charged photosensitive bodies generally vary depending on individual differences between photosensitive bodies, which become fatigued due to continuous printing and temperature variations. Therefore, even in the past, charging potential control has been carried out through feedback control in order to eliminate the effect of these surface potential fluctuations. The feedback control is carried out by measuring the surface potential of the photosensitive body after charging using surface potential sensors. Nevertheless, since the installation positions of the surface potential sensors and the developing positions differ, even if the surface potentials at the positions of the surface potential sensors are maintained at constant values by the feedback control, the surface potentials at the developing positions will differ due to the dark decay of the photosensitive body. Dark decay is a phenomenon in which the surface potential of the photosensitive body decreases with passage of time.

Therefore, in the past, to compensate for the dark decay of the photosensitive body due to the differences between the positions of the surface potential sensors and the developing positions, the dark decay on the photosensitive body was measured in advance and the charging potential control constant was varied according to these results. However, by this method, the dark decay of the photosensitive body had to be measured beforehand, and it was difficult to obtain an accurate correction value for individual differences of photosensitive bodies. Therefore, there is still a problem in maintaining constant surface potentials at the developing positions.

In the prior art, as shown in FIG. 6, the surface potential is measured with a surface potential sensor located between the position of the charger and the position of the developing unit. The surface potential varies greatly due to the difference of dark decay between the charging position and the developing position. However, by carrying out this type of measurement, the fluctuation range of the surface potential is smaller due to proximity of the sensor to the developing position.

In the above method, it is possible to decrease the fluctuation of the surface potential. However, particularly in photosensitive bodies with large temperature variations or fatigue due to large continuous printing, perfect correction is difficult. In this case, a second control method can be considered.

By estimating the fluctuation component from the characteristics of the photosensitive body and changing the convergence value of the potential at the position of the surface potential sensor in advance according to the conditions, the difference from the actual the surface potential at the developing position is even smaller.

FIG. 7 shows another prior art method of controlling the surface potential for the case of a photosensitive body which has a slow dark decay at low temperature and a faster dark decay at high temperature. In this method, the potential is controlled at the developing position by setting the surface potential at the surface potential sensor position to be low at low temperature and high at high temperature. The situation is similar for fatigue of the photosensitive body due to continuous printing, so that the potential at the surface potential sensor position should be controlled by estimating beforehand the variation of the dark decay during continuous printing.

These situation may be summarized that, if the time during which the photosensitive body moves between the surface potential sensor position and the developing position is taken at T, the dark decay $\Delta V$ at time T varies due to the temperature conditions and the continuous printing conditions, and if the required potential at the developing position is taken as V, the potential at the surface potential sensor position is given by $$V+\Delta V$$

Here, when correcting for the temperature variation, the temperature in the vicinity of the photosensitive body is detected by a temperature detecting element and the correction can be effected by changing the value of $\Delta V$ automatically. In the case of correcting for the continuous printing variation, the number of sheets printed is counted and the correction can be carried out by changing the value of $\Delta V$ automatically.

SUMMARY OF THE INVENTION

It is an object of the present invention to provide a recording apparatus which can obtain a stable recorded image with a high picture quality by maintaining substantially constant surface potentials at the developing positions, regardless of individual differences of photosensitive bodies.

According to one aspect of the present invention, there is provided a recording apparatus including a photosensitive body, means for charging the photosensitive body, means for forming a latent image on the photosensitive body charged by the charging means, and means for developing the latent image into a visible image on the photosensitive body, the apparatus comprising first measuring means for measuring the surface potential of the photosensitive body at a position before the developing means, second measuring means for measuring the surface potential of the photosensitive body at a position after the developing means, means for computing the surface potential of the photosensitive body at a position between the first and second measuring means to estimate the surface potential at the position of the developing means, and means for controlling the charging means so that the estimated surface potential.

It is preferred that the photosensitive body includes a photosensitive drum which is rotatable to successively pass the charging means, the first measuring means, the latent image forming means, developing means and the second measuring means.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawing of which:

FIG. 2 to 17 are provided to explain an embodiment of the present invention; in which FIG. 2 is a block diagram showing the outline of the recording apparatus concerned in the present invention;

FIG. 3 is a configurational diagram showing a two-color image laser beam printer to which the recording apparatus concerned in the present invention has been applied;

FIG. 4 is a graph showing the surface potential characteristics due to continuous printing fatigue of the photosensitive body;

FIG. 5 is a graph showing the surface potential characteristics due to temperature variations of the photosensitive body;

FIG. 6 is a graph showing the surface potential characteristics of the photosensitive body in the case of potential compensation without taking temperature into account;

FIG. 7 is a graph showing the surface potential characteristics of the photosensitive body in the case of potential compensation when temperature is taken into account;

FIG. 8 is a diagram showing the relationship between the surface potential characteristic of the photosensitive body and positions around the photosensitive body;

FIG. 9 is a block diagram showing the overall construction of the control section;

FIG. 10 is a diagram showing the contents of the data tables stored in the ROM;

FIG. 11 is a diagram showing the details of the interface signals between the interface circuit and the host system;

FIG. 12 is a block diagram showing the details of the process control circuits and their input/output unit;

FIGS 13A–13P are flow-charts showing the overall operation;

FIG. 14 is a flow-chart showing the sub-routine for the potential control during warming-up;

FIG. 16 is a flow-chart showing the sub-routine for pre-first print potential control.

DETAILED DESCRIPTION OF THE PREFERRED EMBODIMENTS

The following is an explanation of an embodiment of the present invention with reference to drawings.

Figure 1:
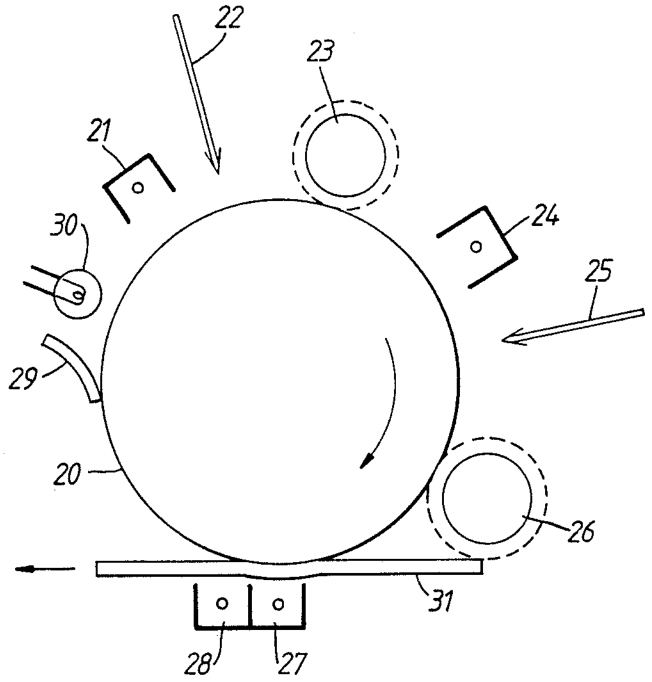
FIG. 1. (PRIOR ART)
FIG. 1 is a explanatory diagram for the configuration of the conventional recording apparatus.
Figure 2:
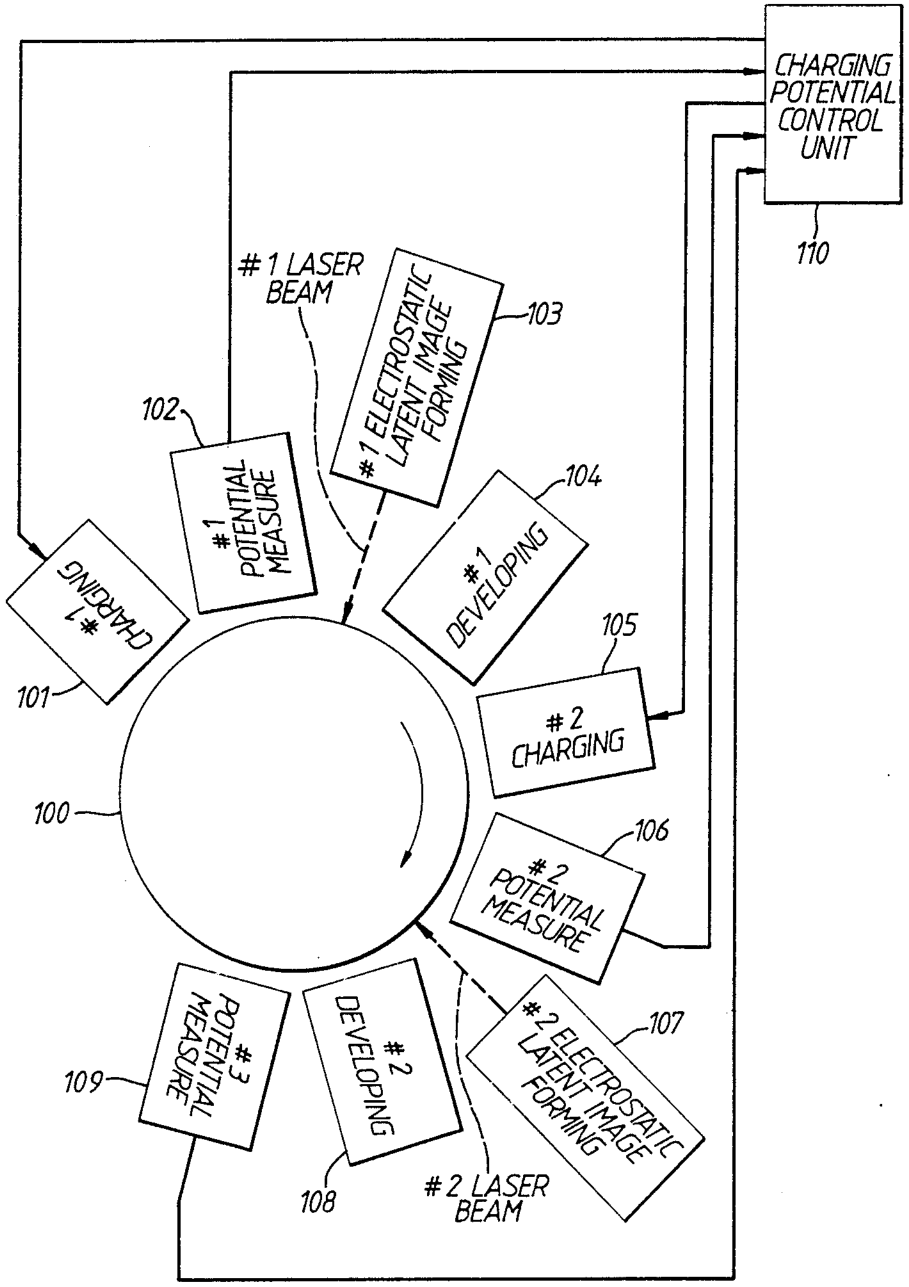

FIG. 2 is a block diagram showing the outline of a recording apparatus of the present invention. In this recording apparatus, the following are arranged around the circumference of a photosensitive body 100. A first color image forming assembly comprises a first charging unit 101, a first potential measurement unit 102, a first electrostatic latent image forming unit 103 and a first developing unit 104. A second color image forming assembly consists of a second charging unit 105, a second potential measurement unit 106, a second electrostatic latent image forming unit 107 and second developing unit 108. A third potential measurement unit is shown at 109. A charging potential control unit 110 executes charging potential control by processing the measurement results of first, second and third potential measurement units 102, 106 and 109 based on a specified computation expression and controlling first and second charging units 101 and 105. In the present invention, charging potential control unit 110 applies a control signal to first charging unit 101 before the start of printing, measures each of the surface potentials by surface potential measurement units 102 and 106, and estimates the surface potential at the position of first developing unit 104 using these two measured surface potentials. In the same way, it applies a control signal to first charging unit 101 and second charging unit 105, measures each of the surface potentials by second and third surface potential measurement units 106 and 109, and estimates the surface potential at the position of second developing unit 108 using these two measured surface potentials. Charging potential control is carried out by charging potential control unit 110, so that the surface potentials of each developing position (each color) which have been estimated in this way become the target surface potentials. During printing, each of the surface potentials is measured by first and second surface potential measurement units 102 and 106, and charging potential control is carried out by controlling the number of times first and second charging units 101 and 105 are actuated, so that the surface potentials at the positions of first and second developing units 104 and 108 become the target surface potentials.

Figure 3:
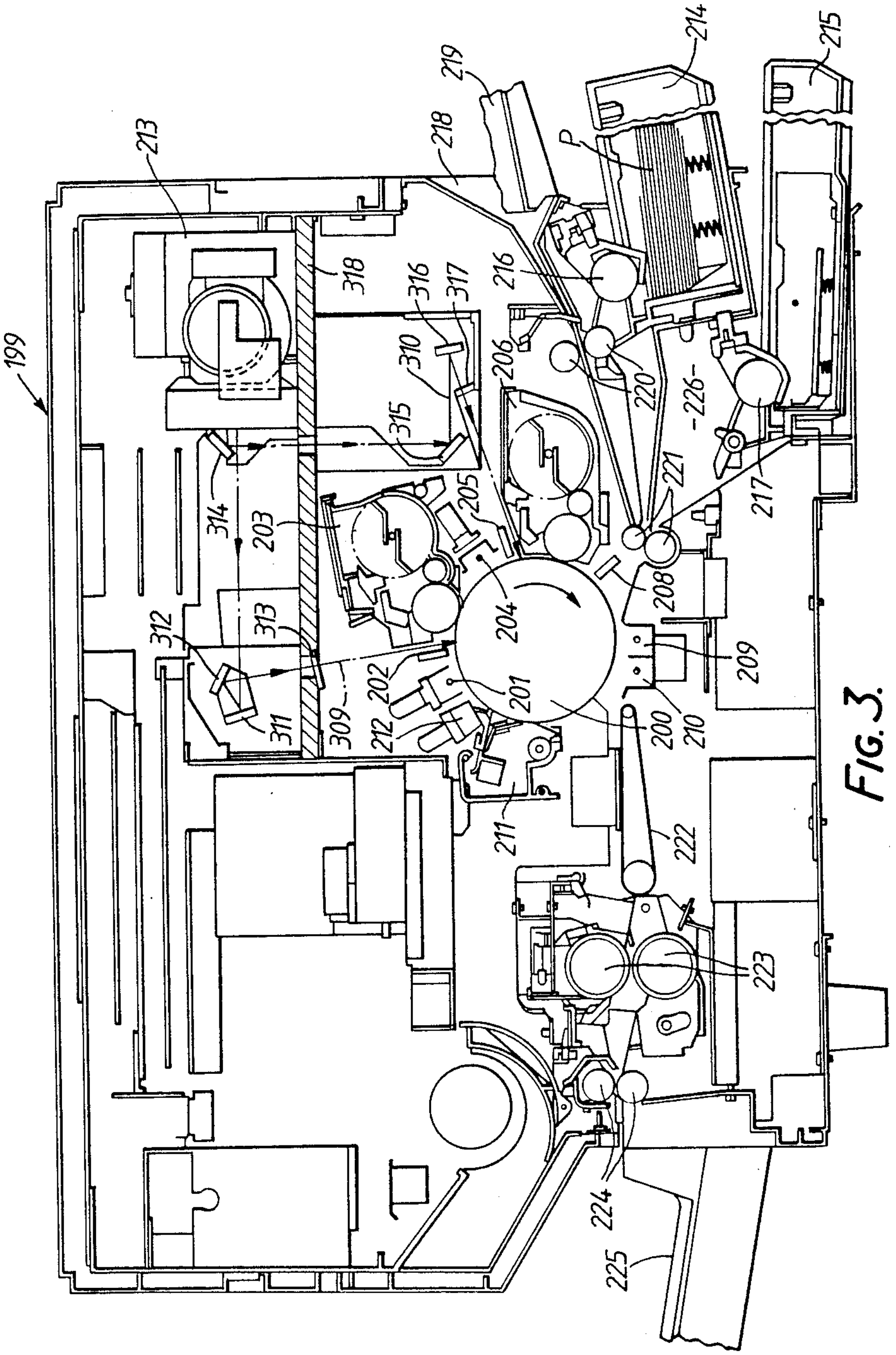

FIG. 3 shows a two-color image laser beam printer 199 incorporated in a recording apparatus. The two-color image laser beam printer 199 is connected to a host system, such as a computer or a word processor, via a transmission control unit and a cable (not shown) in FIG. 3. It receives two types of dot image data from the host system and forms electrostatic latent images on the surface of the photosensitive body by modulating each of two laser beams. Each of the two types of electrostatic latent images corresponds to one of two types of image data which have been formed. Each image of a different color is transferred onto a paper sheet after developing.

A drum-shaped photosensitive body 200 is rotated as an image carrier in the direction indicated by the arrow by a drive source (not shown). The following are arranged successively around the circumference of photosensitive body 200 in the direction of rotation: a first charger 201 (so called "Corotron"), a first surface potential sensor 202, a first developing unit 203, a second charger 204 (so called "Scorotron") for recharging, a second surface potential sensor 205, a second developing unit 206, a third surface potential sensor 208, a transfer charger 209, a separation charger 210, a cleaner 211 and a discharging lamp 212. Each of surface potential sensors 202, 205 and 208 includes a detective electrode, which is opposed to the surface of photosensitive body 200 through a small gap to form a capacitance between the detective electrode and the surface of photosensitive body 200. The detecting of the surface potential of photosensitive body 200 is carried out by vibrating mechanically the capacitance to converts electrostaic field to AC voltage. In this embodiment, for example, "ELECTRIC POTENTIAL SENSOR" (Model: PKE01A; MURATA Mfg. Co., Ltd.) is used as the surface potential sensors.

First developing unit 203 carries out first color developing using a first color toner (non-magnetic, single-component developing agent) and second developing unit 206 carries out second color developing using a second color toner (non-magnetic, single component developing agent). In this case, the above-mentioned developing is carried out with single colors on photosensitive body 200 and the developing agents should not be superimposed on each other.

First, a charge is applied to rotating photosensitive body 200 by first charger 201. At the next stage a first exposure is carried out on photosensitive body 200 by irradiating it with a first laser beam 309. Beam 309 is output from a polygonal mirror scanning unit 213, and reflected and guided by reflecting mirrors 311 and 312, and a first electrostatic latent image is thus formed on photosensitive body 200 by this first exposure. This first electrostatic latent image produced by the first exposure is developed with the first color toner by first developing unit 203 and a first color toner image is formed. Next, the surface of photosensitive body 200 is recharged by second charger 204, and at this stage the unevenness of potential which has occurred on the surface of photosensitive body 200 during the processes up to first developing unit 203 is returned to a uniform state. At the next stage, a second exposure is carried out on photosensitive body 200 by irradiating it with a second laser beam 310. The beam 310 is output from polygonal mirror scanning unit 213, and is reflected and guided by reflecting mirrors 314, 315 and 316, and a second electrostatic latent image is formed on photosensitive body 200 by this second exposure. This second electrostatic latent image produced by the second exposure is developed with the second color toner by second developing unit 206 and a second color toner image is formed.

On one side of the underside of photosensitive body 200, a paper supply unit 226 is provided which supplies paper P, as the copying material, to the underside of photosensitive body 200. Paper supply unit 226 is composed of the following items. An upper and a lower paper supply cassettes 214 and 215 are freely removable and contain a number of sheets of paper P. Paper supply rollers 216 and 217 take out paper P sheet-by-sheet from paper supply cassettes 214 and 215. A manual paper supply platform 219 is mounted in a manual paper supply port 218, which is provided above upper paper supply cassette 214. A pair of paper supply rollers 220 convey paper P supplied from manual paper supply platform 219. A pair of resist rollers 221 receive paper P conveyed by paper supply rollers 216, 217 and 220, align the front edge thereof, and convey the paper in synchronization with the two color toner images formed on photosensitive body 200.

Paper P conveyed by resist rollers 221 is passed to transfer charger 209. By being placed in close contact with photosensitive body 200 at transfer charger 209, the two color toner images on photosensitive body 200 comprised of the first color and the second color, are each transferred onto paper P by the operation of transfer charger 209. Paper P, on which each color toner image has been transferred in this way, is electrostatically peeled from photosensitive body 200 by the operation of separation charger 210. Then paper P is conveyed by a conveying belt 222 to a fixing unit 223, including a pair of heat rollers, and the transferred images are hear-fixed by passing through them. After fixing, paper P is discharged to a receiving tray 225 by a pair of exit rollers 224. Following transfer of the toner images, photosensitive body 200 is electrically discharged by discharging lamp 212 after any residual toner has been removed from the surface of the body 200 by cleaner 211, so that the body 200 is returned to its initial condition.

Next, an optical system is explained in detail. First, as shown in FIG. 3, the following items are mounted on a single base 318: polygonal mirror scanning unit 213; reflecting mirrors 311, 312, 314, 315 and 316 for guiding first and second laser beams 309 and 310, which are scanned by polygonal mirror scanning unit 213, to their specified positions; transmission glasses 313 and 317 for dust-proofing the optical system; and a beam sensor for obtaining horizontal synchronization signals (for example a PIN diode, not shown).

Figure 4:
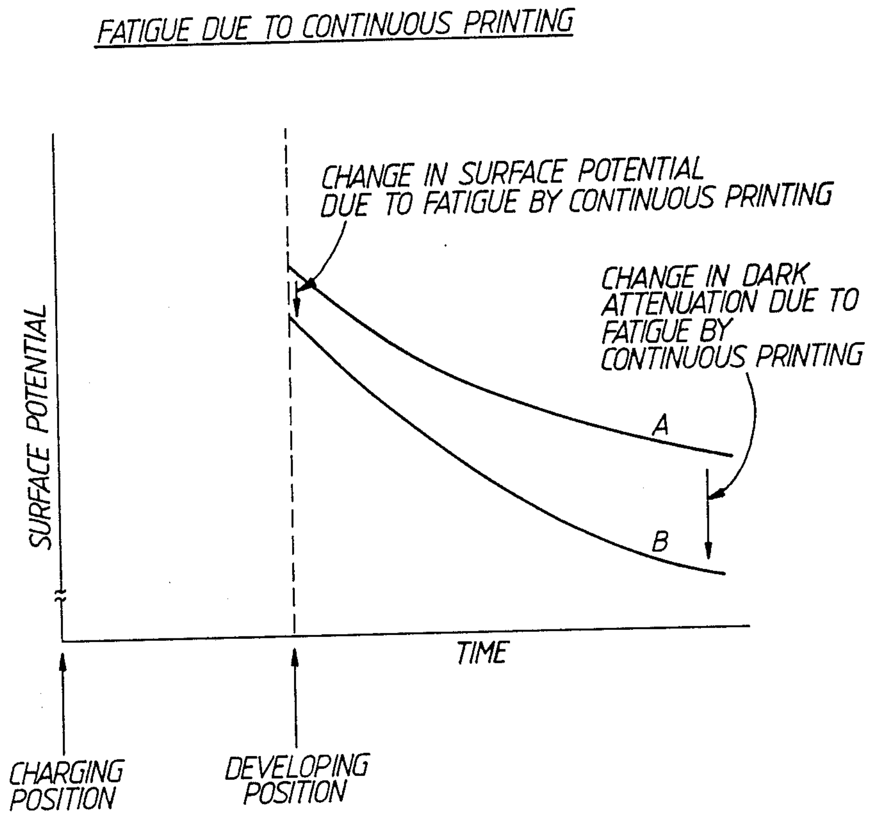
Figure 5:
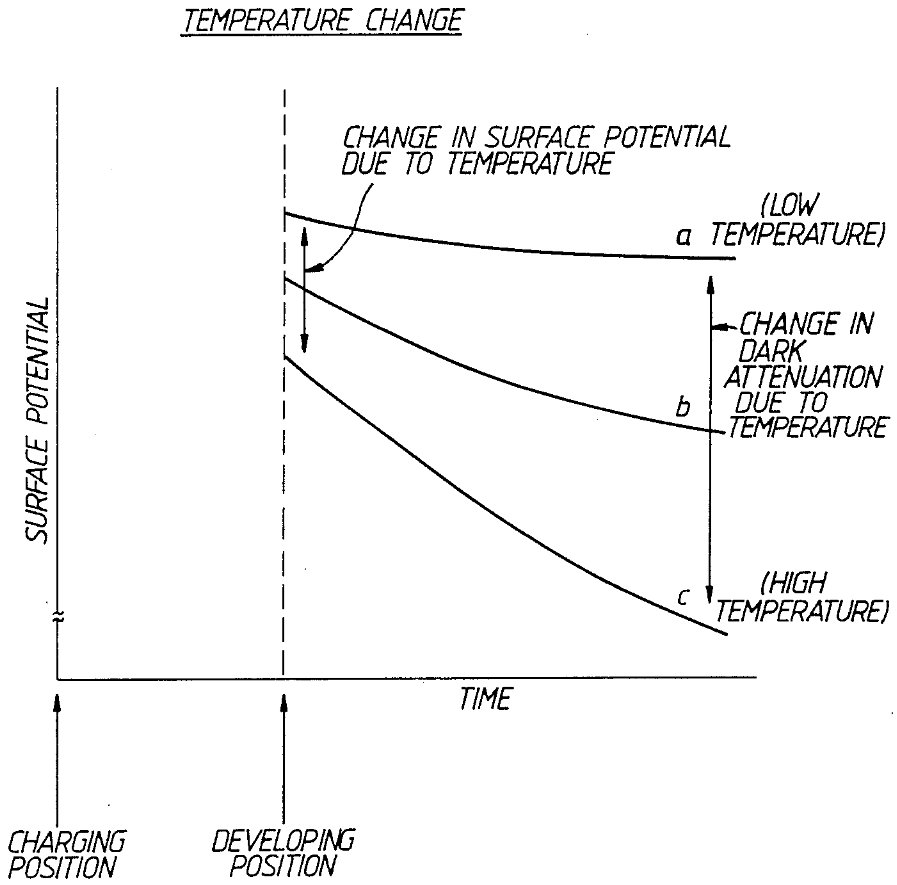
Figure 6:
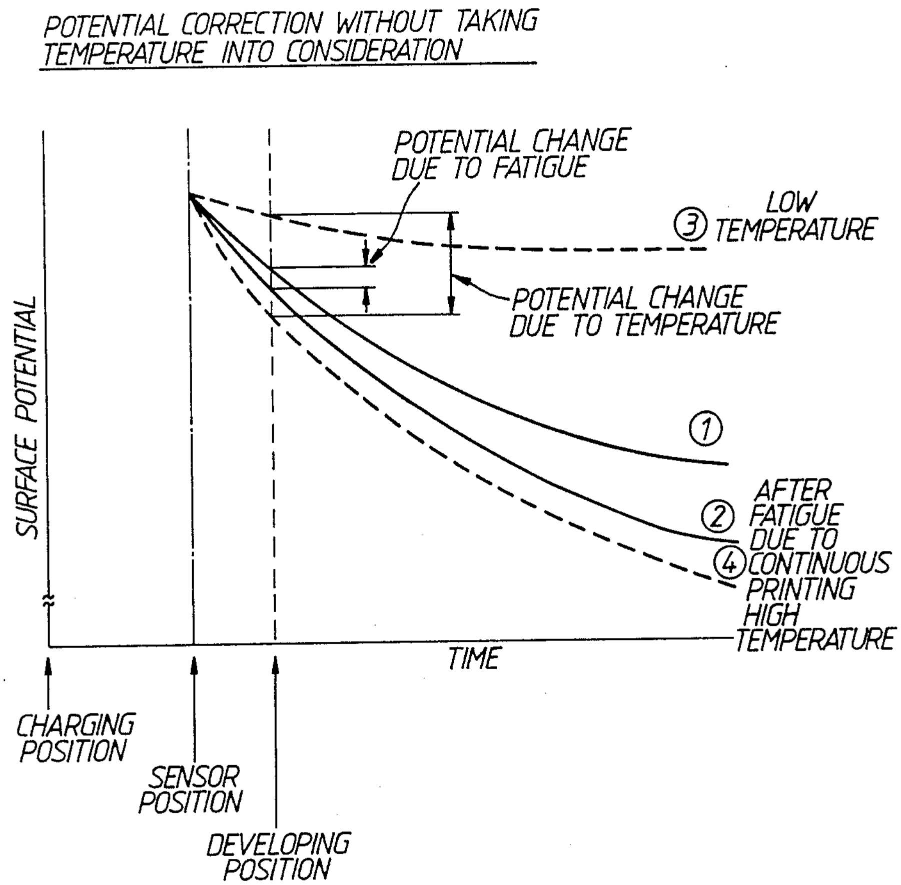
FIG. 6. (PRIOR ART)
Figure 7:
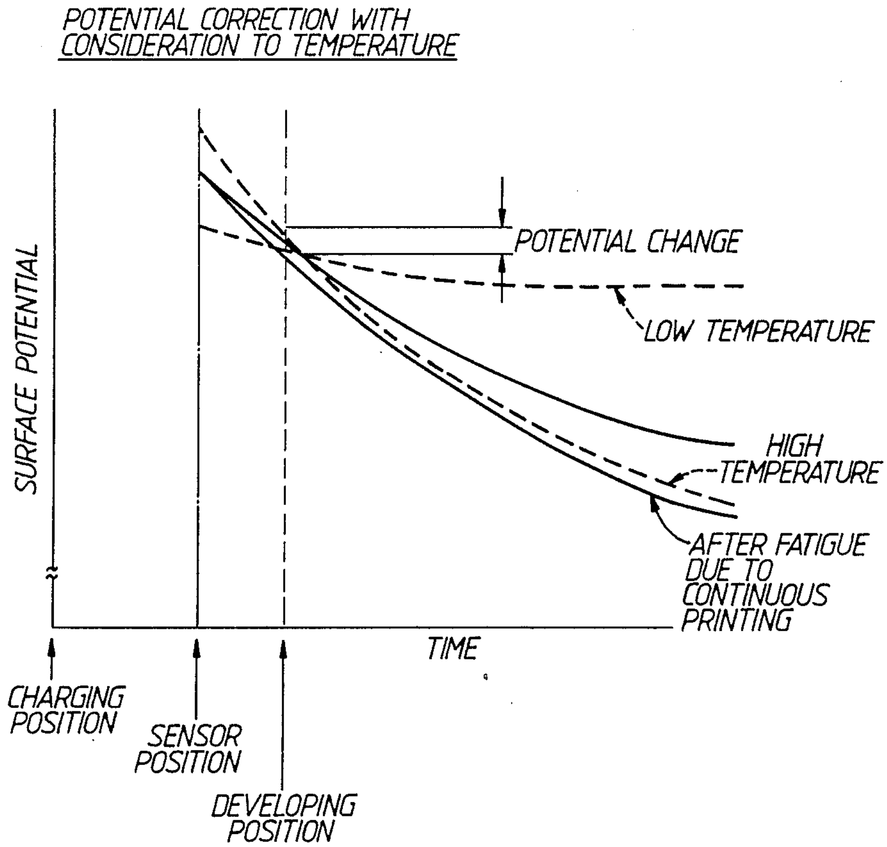
FIG. 7. (PRIOR ART)

In above mentioned two-color image laser beam printer 199, the surface potential of photosensitive body 200 varies depending on (1) individual differences between photosensitive bodies, (2) fatigue of the body 200 due to continuous printing and (3) temperature variations. In order to eliminate these fluctuations in the surface potential of photosensitive body 200, a surface potential feed-back control explained below is carried out in the present invention. FIG. 4 shows an example of surface potential variation due to fatigue caused by continuous printing. FIG. 5 shows an example of the variation of surface potential due to temperature. The dark decay will generally become faster by fatigue of the photosensitive body due to continuous printing use. Thus the surface potential at the developing position will decrease. As for the variation due to temperature, dark decay is generally faster for higher temperature, so that the surface potential at the developing position will reduce. FIGS. 4 and 5 show the measurements by surface potentiometer located at the developing position, which is separated from the charging position by a predetermined angle determined by the arrangement for machine processing. The potential of the photosensitive body which is charged to a predetermined level at the charging position decreases due to dark decay during the time the photosensitive body is rotated from the charging position to the developing position. That potential is the level which is generally called the surface potential, and it has a great influence on developing conditions. Thus, it has a direct influence on the quality of the printed image. Therefore, it is important to maintain the surface potential at the developing position at a substantially constant value.

In the above-mentioned embodiment, there are provided two chargers (first and second chargers), and both images, after exposure, are made visible by the first and the second developing units. Further, in order to interpolate the surface potential at each of the two developing positions, surface potential sensors are provided between the first charger and the first developing unit, between the second charger and the second developing unit and after the second developing unit. The first charger and the second charger are each controlled by the outputs of these sensors. In two-color image printing it is important to prevent color mixing on the photosensitive body and on the developing roller of the second developing unit. In the present invention, this is done by setting the potential at the stage of the second developing unit at a determined level by controling the charging of the second charger.

There may be a variety of ways for controlling the chargers. In the embodiment of the present invention, a corotron is used for the first charger and a scorotron for the second charger. In the corotron, the high DC voltage applied to its charging wire is controlled, while in the scorotron, the voltage applied to its grid wires is controlled.

Figure 8:
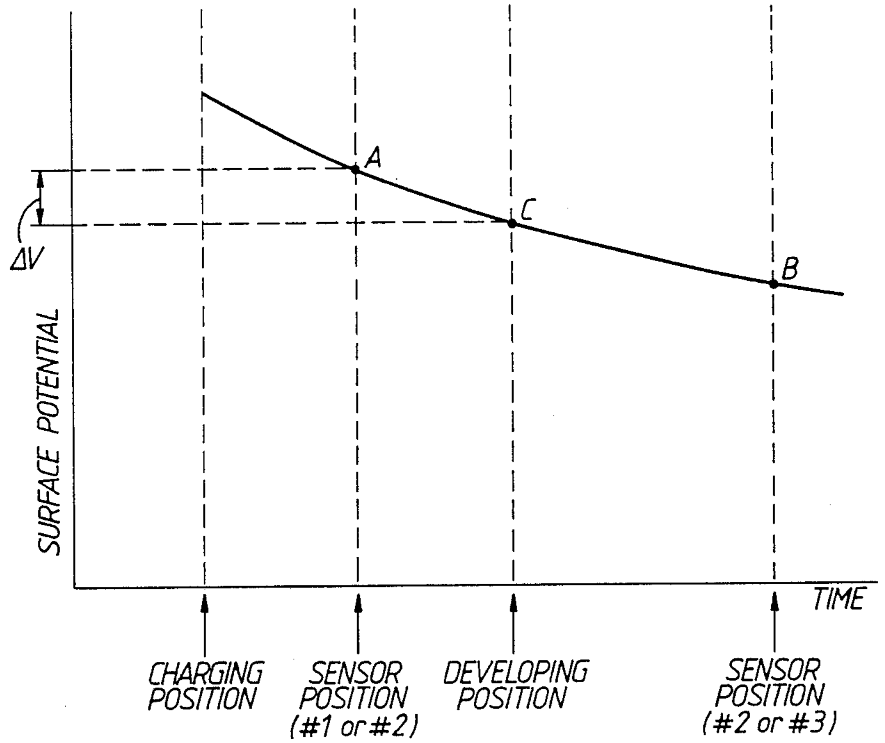

In the present invention, the dark decay $\Delta V$ is obtained before the start of printing. As shown in FIG 8, before printing starts, the surface potentials at point A and point B are respectively measured by using the first surface potential sensor and the second surface potential sensor. Using these values the surface potential at point C is estimated. When the surface potential at point C is obtained, the potential difference $\Delta V$ between point A and point C can be obtained. Therefore, this $\Delta V$ is the dark decay value between the first surface potential sensor and the first developing unit. In the same way, by using the second surface potential sensor and the third surface potential sensor, the dark decay value $\Delta V$ between the second surface potential sensor and the second developing unit can be obtained. Here, the dark decay values obtained for $\Delta V$ are substituted in the expression $V+\Delta V$, and by this means the target surface potentials at the optimum surface potential sensor positions on the photosensitive body used for each color are determined. By using the surface potentials at the surface potential sensor positions, the surface potentials at the developing positions can be controlled at the optimum values for developing. Also, even if the photosensitive body is replaced, since the dark decays are automatically obtained and the dark decay components can be corrected before the start of printing, optimum surface potential control can always be effected for every photosensitive body used.

Next, the electrical composition of an embodiment of the present invention is described.

Figure 9:
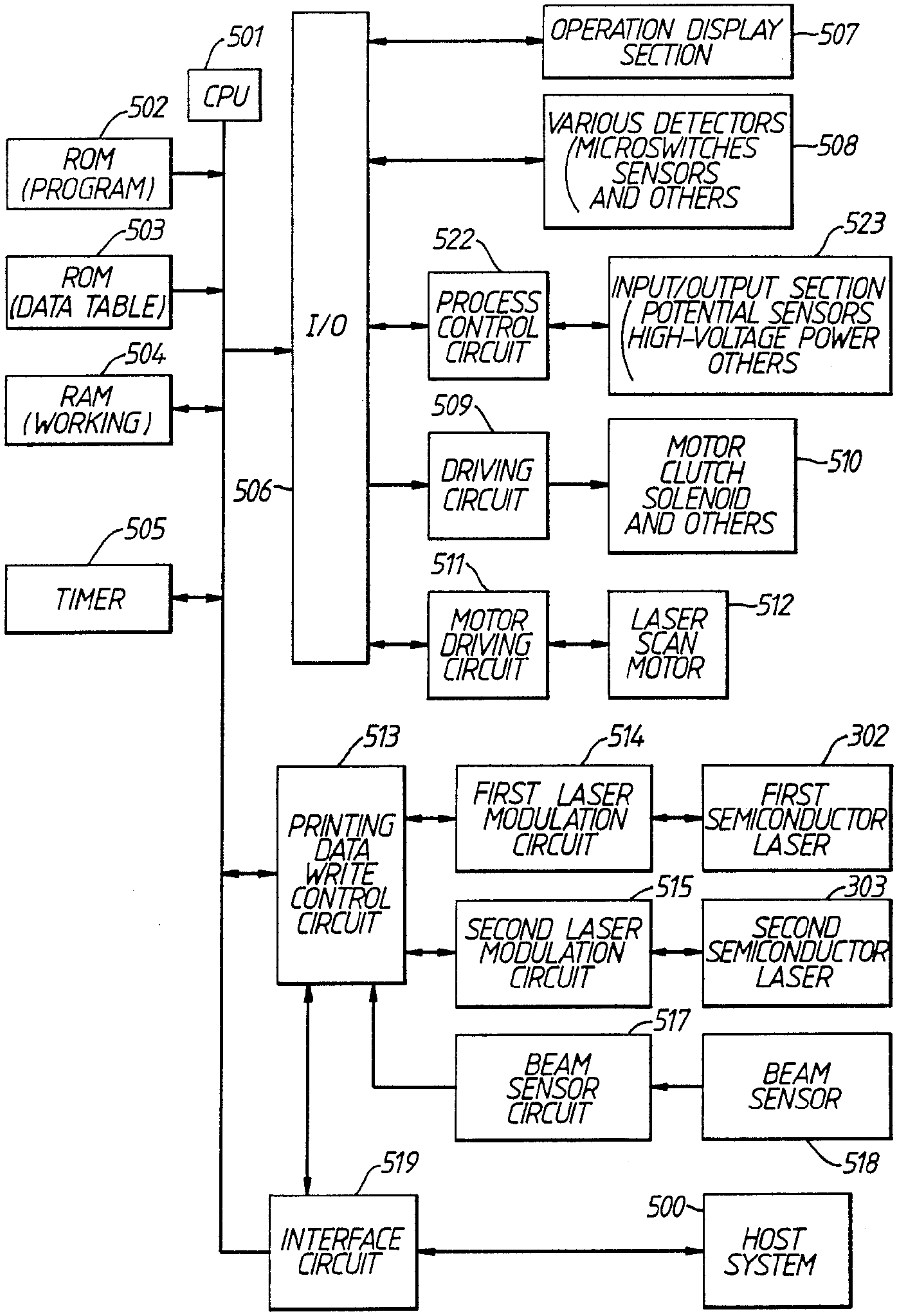
Figure 11:
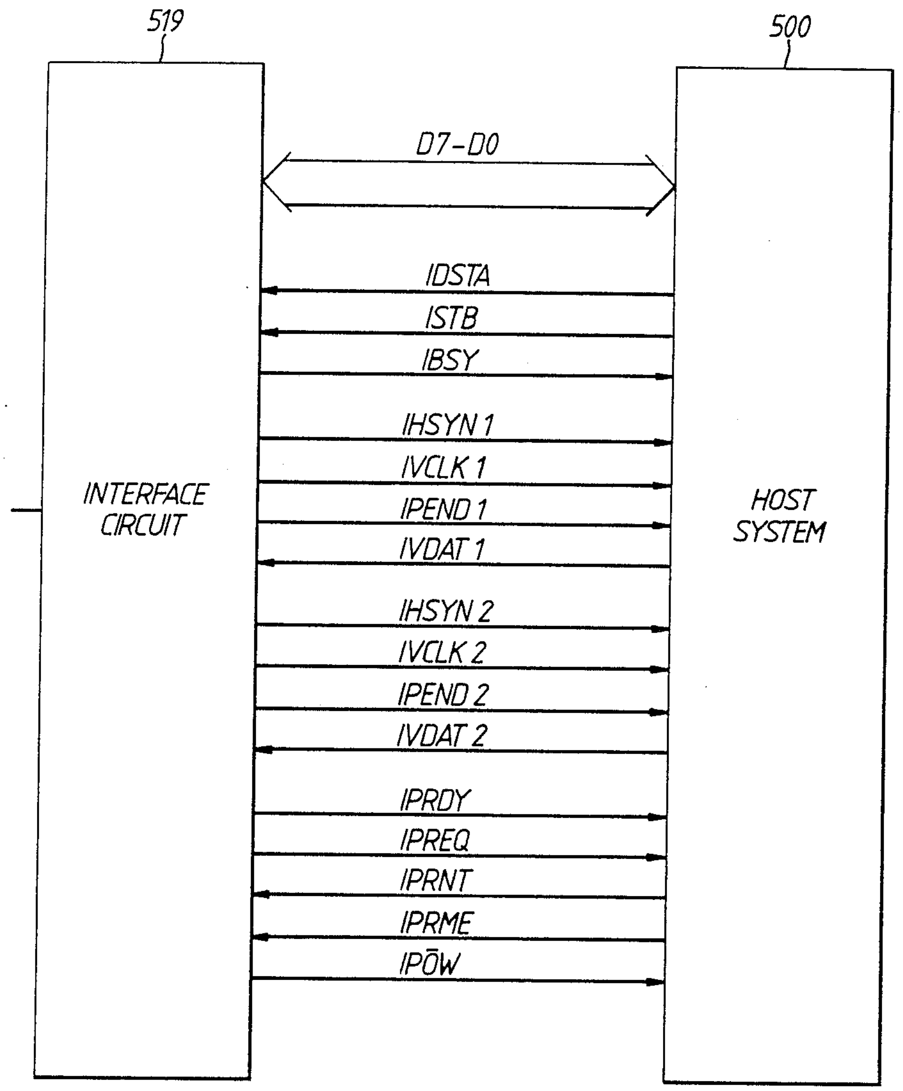

FIG. 9 is a block diagram showing a control section of the two-color image laser beam printer 199 constructed as described above. The control section of the two-color image laser beam printer includes basically a ROM 502 which houses a system program with CPU 501 as the control center, a ROM 503 which houses a data table, a ROM 504 which is used as a working memory, a timer 505, an I/O port 506 for I/O data, a write control circuit 513 for printing data, and an interface circuit 519.

As shown in FIG. 10, the contents of the data table stored in ROM 503 consist of top margin control data for a first color stored in addresses (4000) and (4001), top margin control data for a second color stored in addresses (4002) and (4003), and left margin control data stored in addresses (4004) and (4005).

Further, in addresses (4006) and (4007) there are stored bottom margin control data in the case of paper size of A3 and in addresses (4008) and (4009) right margin control data for the same size of the paper are stored. In a similar manner, tables corresponding to various sizes of the paper are stored up to the address (4083).

In addresses starting with (4090) there are stored coarse adjustment data for top margin, in addresses starting with (40B0) there are stored fine adjustment data for top margin, in addresses starting with (40D0) there are stored coarse adjustment data for left margin, in addresses starting with (4100) there are stored fine adjustment data for left margin, and in addresses starting with (4120) there are stored data for correcting scanning length for two beams, each of the forgoing data corresponding to switches from 1 to n.

These margin control data, coarse adjustment data, and fine adjustment data will be used as the setting data a margin controlling counter and a binary counter, of a printing data write control circuit 513 that will be described later.

In addresses (6000) and (6001) there are stored a first development bias data for red toner, and in addresses (6002) and (6003) there are stored a second development data for the same color. Similarly, first and second development bias data for blue toner, green toner, and black toner are stored in the addresses up to (600F). These will be used as the setting data for development bias control for a process control circuit 522 that will be described later.

In addresses (6100) and (6101) there are stored target surface potential table data for a first charging potential control, having a reference value of 25° C.

In addresses (6102) and (6103) there are stored error table data in convergence, which represents a tolerance control range for the target surface potential. In the addresses (6104) and (6105) there are stored output table data for a first time control, which will be used as a setting value for a first charger which is output for the first time during the warming up.

In addresses (6106) and (6107) there are stored minimum correction table data.

In addresses (6108) and (6109) there are stored surface potential limits table data, in addresses (610A) and (610B) there are stored control output upper limits table data, and in addresses (610C) and (610D) there are stored control output lower limits table data. The surface potential limits table data, the control output upper limits table data, and the control output lower limits table data will be used for self diagnosis of the control system.

Following them tables that correspond to second charging potential control are stored in addresses up to (611B). In addresses starting with (6120) there are stored charging potential temperature correction table data for a temperature range of 10° C. to 40° C., which serves as a temperature correction data for the target surface potential table data of 25° C.

Timer 505 is a general purpose timer and generates fundamental timing for controlling the paper conveying and the processes around the photosensitive body, etc.

I/O port 506 carries out outputting of display data to an operation displaying section 507, inputting of various kinds of switch data or the like, inputting to each of the sensor in the control section, outputting to driving circuits for driving elements such as motor clatches, solenoids, outputting to a driving circuit 511 for driving a laser scan motor 512 that scan the two laser beams, and inputting the outputting to and from a process control circuit 522 which controls the input and output for an input/output section 523 including various sensors and high-voltage power sources, etc.

Printing data write control circuit 513 controls the driving of a first laser moduration circuit 514 for optically modulating a first semiconductor laser 302 for image data writing of the first color and a second laser modulation circuit 515 for optically modulating the second semiconductor laser 303 for image data writing of the second color, and controls the writing of the printing data of video image sent from a host system 500 in a predetermined position on the photosensitive body. In this case, a beam sensor 518 detects first laser beam 309 that is scanned by a laser scanning motor, horizontal synchronized signal HSYO is generated by a beam sensor circuit 517 by digitizing analog signals for beam sensor 518 with a high-speed comparator, and beam sensor circuit 517 sends out the signal HSYO to print data write control circuit 513.

An interface circuit 519 carries out outputting of status data to host system 500 as well as receiving of command data and printing data from host system 500.

In addition, there is provided a power supply section 520 to supply power to each of these control sections.

Figure 12:
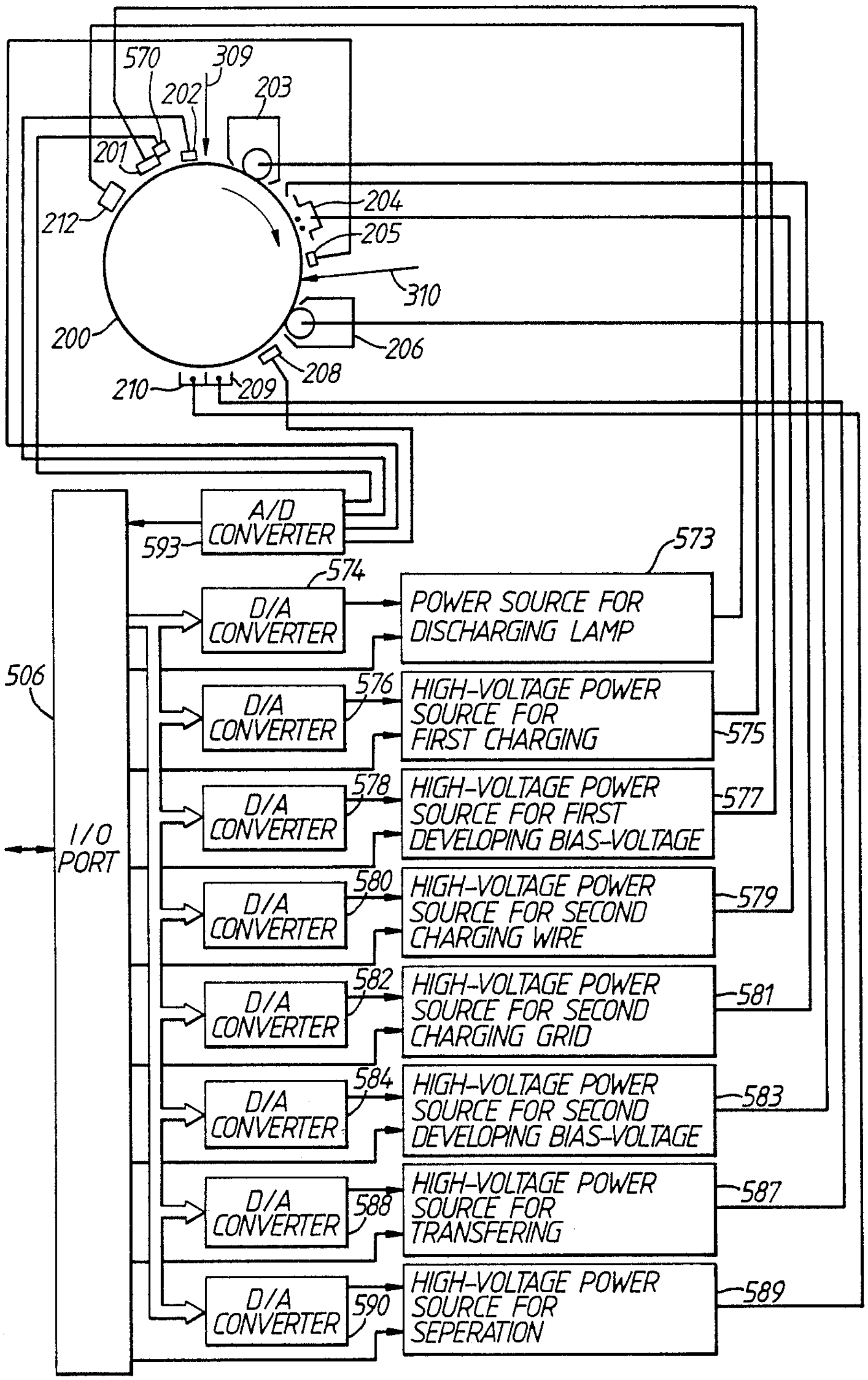

FIG. 12 shows the details of the interface signals that are transferred between interface circuit 519 and host system 500. D7-D0 is an 8 bit bi-directional data bus, IDSTA is a selector signal for data bus D7-D0, which selects whether the data bus is used as a status data bus to host system 500 or as a command data bus from host system 500. ISTB is a strobe signal for latching command data into interface circuit 519, and IBSY is a signal which permits the transmission of strobe signal ISTB and the reading of the status data. IHSYN1 is a horizontal synchronization signal for the first color which requests the transmission of one line of printing data. IVCLK1 is a video clock signal for the first color which requests the transmission of one dot of printing data. IPEND1 is a page end signal for the first color which informs the completion of one line of printing.

Host system 500 transmits a video data signal IVDAT1 for the first color dot image data, based on these signals IHSYN1 and IVCLK1 and discontinues the transmission when signal IPEND1 is received. Similarly, IHSYN2 is a horizontal synchronization signal for the second color, IVCLK2 is a video clock signal for the second color and IPEND2 is a page end signal for the second color. Host system 500 transmits a video data signal IVDAT2 for the second color dot image data, based on these signals IHSYN2 and IVCLK2, and discontinues transmission when signal IPEND2 is received. These video signals IVDAT1 and IVDAT2 are transmitted to printing data write control circuit 513. IPRDY is a signal informing that two-color image laser beam printer 199 is in the ready state. IPREQ is a signal which permits the transmission of a print start signal IPRNT from host system 500. IPRME is a prime signal which initialises two-color image laser beam printer 199. IPOW is a signal which informs that two-color image laser beam printer 199 is the on-state.

FIG. 12 shows details of process control circuit 522 and its input/output section 523. The charging wire of first charger 201 is connected to the output of a high-voltage power source 575 for first charging. For the inputs of high-voltage power source 575, the output of a D/A converter 576, which alters the high-voltage output voltage, and the signal from I/O port 506, which switches the high-voltage output ON and OFF, are input. The input of D/A converter 576 is connected to I/O port 506 and controls the output voltage of high-voltage power source 575 from CPU 501 via D/A converter 576. Reference numeral 570 denotes a temperature sensor which detects the temperature in the vicinity of photosensitive body 200, and its output is input to an A/D converter 593. The output of A/D converter 593 is input to I/O port 506 and is processed in CPU 501. The output of first surface potential sensor 202, which detects the surface potential of photosensitive body 200, is input to A/D converter 593. The developing roller of first developing unit 203 is connected to the output of a high-voltage power source 577 for application of first developing bias voltage. For the inputs of high-voltage power source 577, the output of a D/A converter 578, which alters the high-voltage output voltage, and the signal from I/O port 506, which switches the high-voltage output ON and OFF, are input. The input of D/A converter 578 is connected to I/O port 506 and controls the output voltage of high-voltage power source 577 from CPU 501 via D/A converter 578. The output of high-voltage power source 577 is a superimposed voltage of AC and DC.

The charging wire of second charger 204 is connected to the output of a high-voltage power source 579 for second charging wire, and the grid of second charger 204 is connected to the output of a high-voltage power source 581 for second charging grid. For the inputs of high-voltage power source 579, the output of a D/A converter 580, which alters the high-voltage output voltage, and the signal from I/O port 506, which switches the high-voltage output ON and OFF, are input. The output of a D/A converter 582, which alters the high-voltage output voltage, and the signal from I/O port 506, which switches the high-voltage output ON and OFF, are input to high-voltage power source 581. The inputs of D/A converters 580 and 582 are respectively connected to I/O port 506 and control the output voltage of high-voltage power source 579 and the output voltage of high-voltage power source 581 from CPU 501 via D/A converters 580 and 582.

The output of second surface potential sensor 205, which detects the surface potential of photosensitive body 200, is input to A/D converter 593. The developing roller of second developing unit 206 is connected to the output of a high-voltage power source 583 for application of second developing bias voltage. The output of a D/A converter 584, which alters the high-voltage output voltage, and the signal from I/O port 506, which switches the high-voltage output ON and OFF, are input to high-voltage power source 583. The input of D/A converter 584 is connected to I/O port 506 and controls the output voltage of high-voltage power source 583 from CPU 501 via D/A converter 584. The output of high-voltage power source 583 is a DC voltage. The output of third surface potential sensor 208, which detects the surface potential of photosensitive body 200, is input to A/D converter 593.

The charging wire of transfer charger 209 is connected to the output of a high-voltage power source 587 for transferring the toner image to the paper. The output of a D/A converter 588, which alters the high-voltage output voltage, and the signal from I/O port 506, which switches the high-voltage output ON and OFF, are input to high-voltage power source. The input of D/A converter 588 is connected to I/O port 506 and controls the output voltage of high-voltage power source 587 from CPU 501 via D/A converter 588. The charging wire of separation charger 210 is connected to the output of a high-voltage power source 589 for separation of the paper from the body 200. The output of a D/A converter 590, which alters the high-voltage output voltage, and the signal from I/O port 506, which switches the high-voltage output ON and OFF, are input to high-voltage power source 589. The input of D/A converter 590 is connected to I/O port 506 and controls the output voltage of high-voltage power source 589 from CPU 501 via D/A converter 590. Discharging lamp 212 is connected to the output of a power source 573 for discharging the surface potential of the drum. The output of a D/A converter 574, which alters the output intensity of discharging lamp 212, and the signal from I/O port 506, which switches the discharging lamp output ON and OFF are input to power source 573. The input of D/A converter 574 is connected to I/O port 506 and controls the output voltage of power source 573 from CPU 501 via D/A converter 574.

Next, the operations in the above type of construction are described with reference to the flow-charts in FIGS. 13 to 17.

FIG. 13 is a flow-chart showing the overall operation. First, the various processes for self-diagnosis and warming-up are shown in FIGS. 13A–13D. When the operator switches the power ON, the control program stored in ROM 502 starts. First, the self-diagnosis process in steps A101–A104 is executed. When the door switch is OFF (Step A101-"YES"), the door open process (Step A105) is run. When the paper discharging switch is ON (Step A102-"NO"), when the manual stop switch is ON (Step A103-"NO"), or when the path sensor is ON (Step A104-"NO"), the jam process (Step A106) is run in each case. Then, when not in the test print mode or the maintenance mode (Steps A107-"NO", A108-"NO"), the heater lamp of fixing unit 223 is switched ON (Step A111) and the warming-up process is commenced. Next, the motor of fixing unit 223 and a scanning motor (not shown) are switched on (Step A112). When in the test print mode (Step A107-"YES"), the test print process is executed (Step A109) and when in the maintenance mode (Step A108-"YES"), the maintenance process is executed (Step A110).

When the scanning motor has been switched ON and is in the ready state (Step A113-"YES"), the blade solenoid of cleaner 211 is switched ON (Step A114). When the scanning motor is not in the ready state even though it has been switched ON and the specified time has elapsed (Step A113-"NO", Step A115-"YES"), the breakdown process for the scanning motor is carried out (Step A116). Next, after a delay process (Step A117), the drum motor which drives photosensitive body 200, the developer motor for driving the developing units, the clutch for first developing unit 203, the clutch for second developing unit 206 and discharging lamp 212 are all switched ON (Step A118). Passing through a delay process (Step A119), a first laser unit, a second laser unit, the laser test are all switched ON (Step A120). Next, after a delay process (Step A121), breakdown judgements on the first laser unit and the second laser unit are made by a monitor (Steps A122, A123). If they are correct (Step A122-YES, Step A123-"YES"), a test is made by the horizontal synchronization signal HSYNC to see if beam detection is ready (Step A126), the laser test is switched OFF and, at the same time, transfer charger 209 is switched ON (Step A128). If the first laser unit has broken down (Step A122-"NO"), the first laser breakdown process is executed (Step A124), and if the second laser unit has broken down (Step A123-"NO"), the second laser breakdown process is executed (Step A125). Also, if a beam is not detected by horizontal synchronization signal HSYNC (Step A126-"NO"), the beam detection breakdown process is executed (Step A127).

Figure 14:
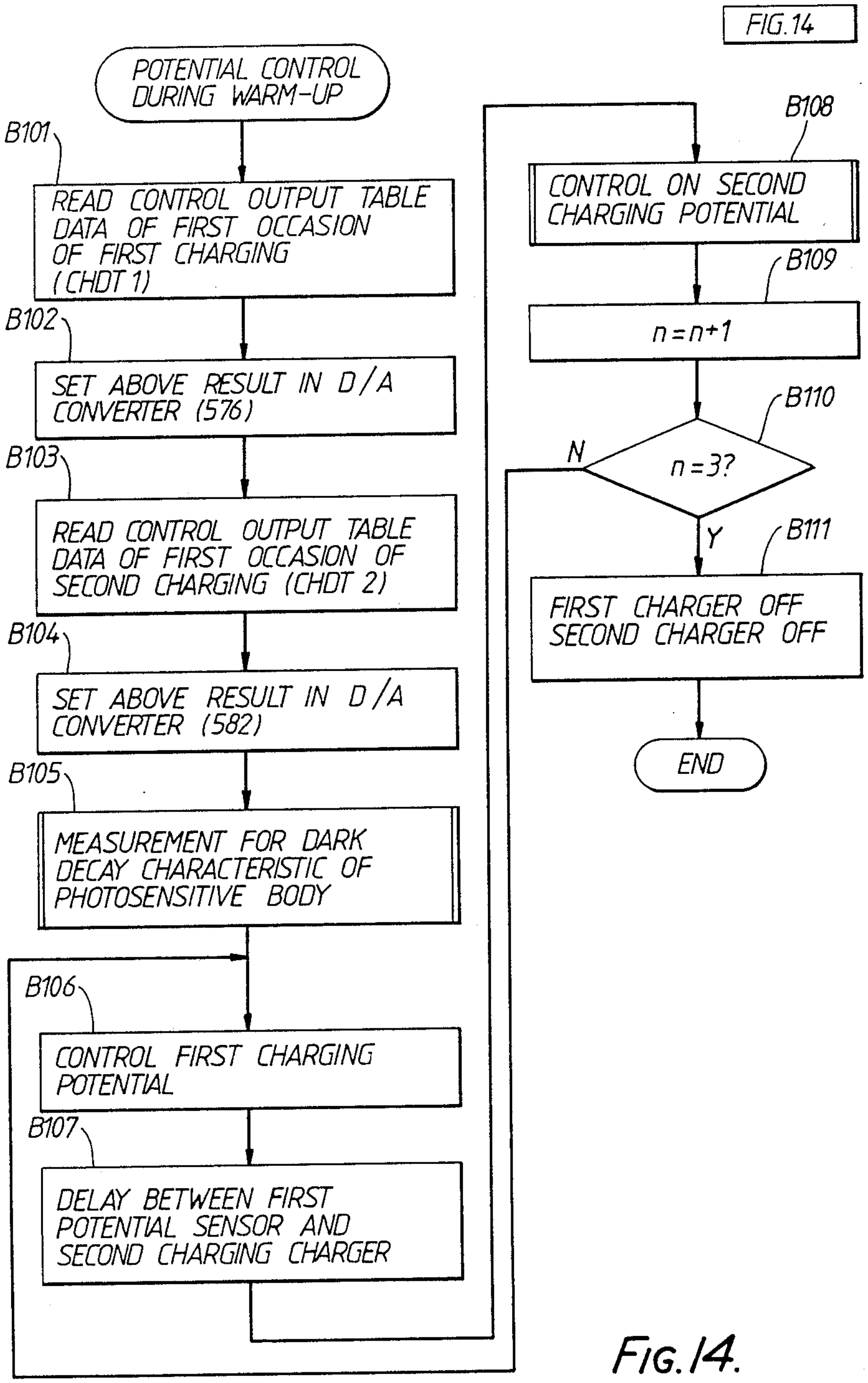

Next, after a delay process (Step A129), separation charger 210 is switched ON (Step A130). Passing through a delay process (Step A131), potential control for the warming-up period is executed (Step A132), as shown in FIG. 14. Step A132 is a process to make it possible to print as quickly as possible at the commencement of printing. Next, after a delay process (Step A133), transfer charger 209 and separation charger 210 are all switched OFF (Step A134). Passing through a delay process (Step A135), the developer motor, the clutch for first developing unit 203, the clutch for second developing unit 206, first charger 201 and second charger 204 are all switched OFF (Step A136). Next, after a delay process (Step A137), the drum motor, discharging lamp 212, the first laser unit, the second laser unit and the motor of fixing unit 223 are all switched OFF (Step A138). Passing through a delay process (Step A139), the blade solenoid is switched OFF (Step A140). After this, the self-diagnosis and warming-up processes end with fixing unit 223 being in the ready state (Step A141-"YES"), and the operation proceeds to the routine shown in FIG. 13B.

Figure 13A:
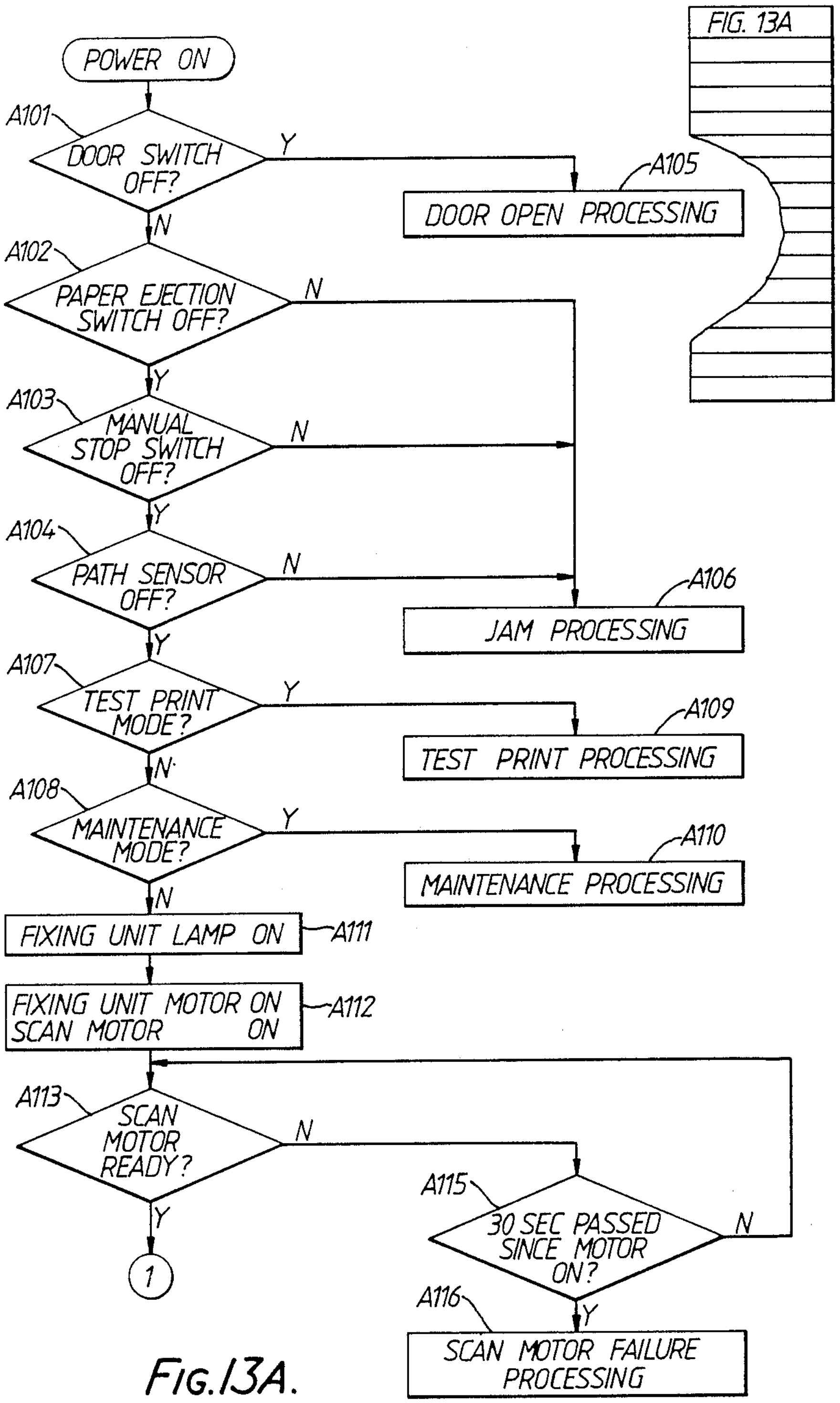
Figure 13E:
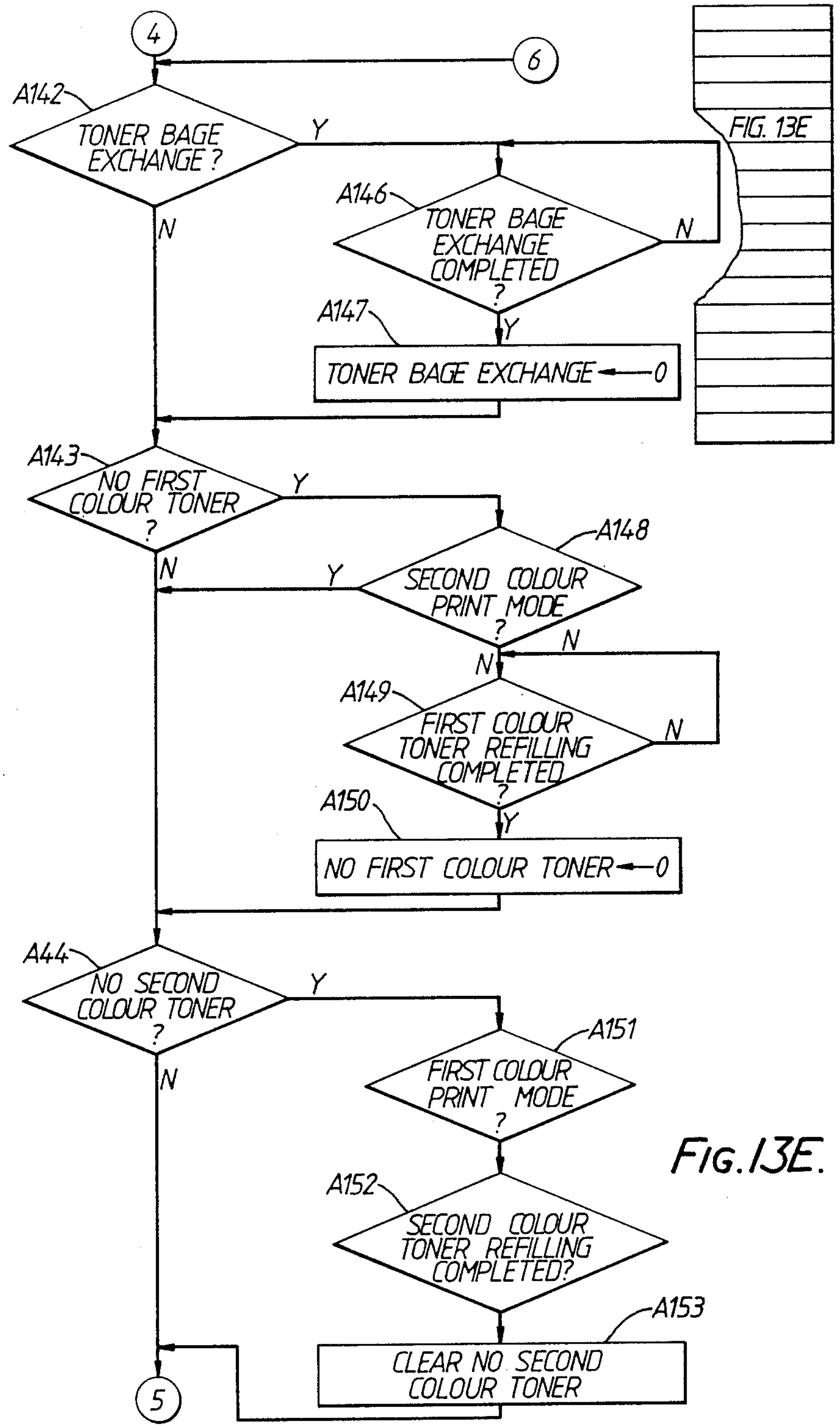
Figure 13G:
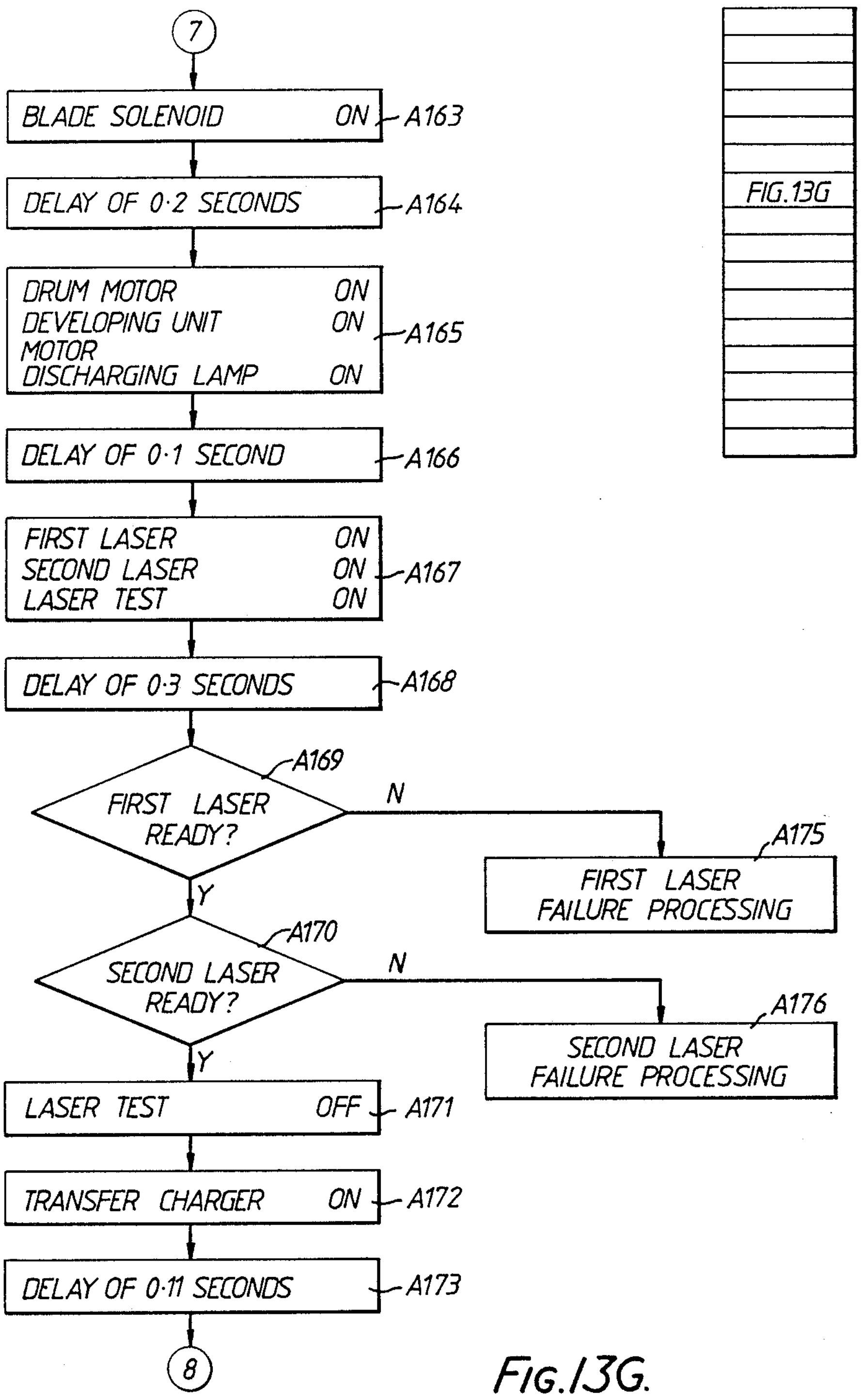
Figure 13I:
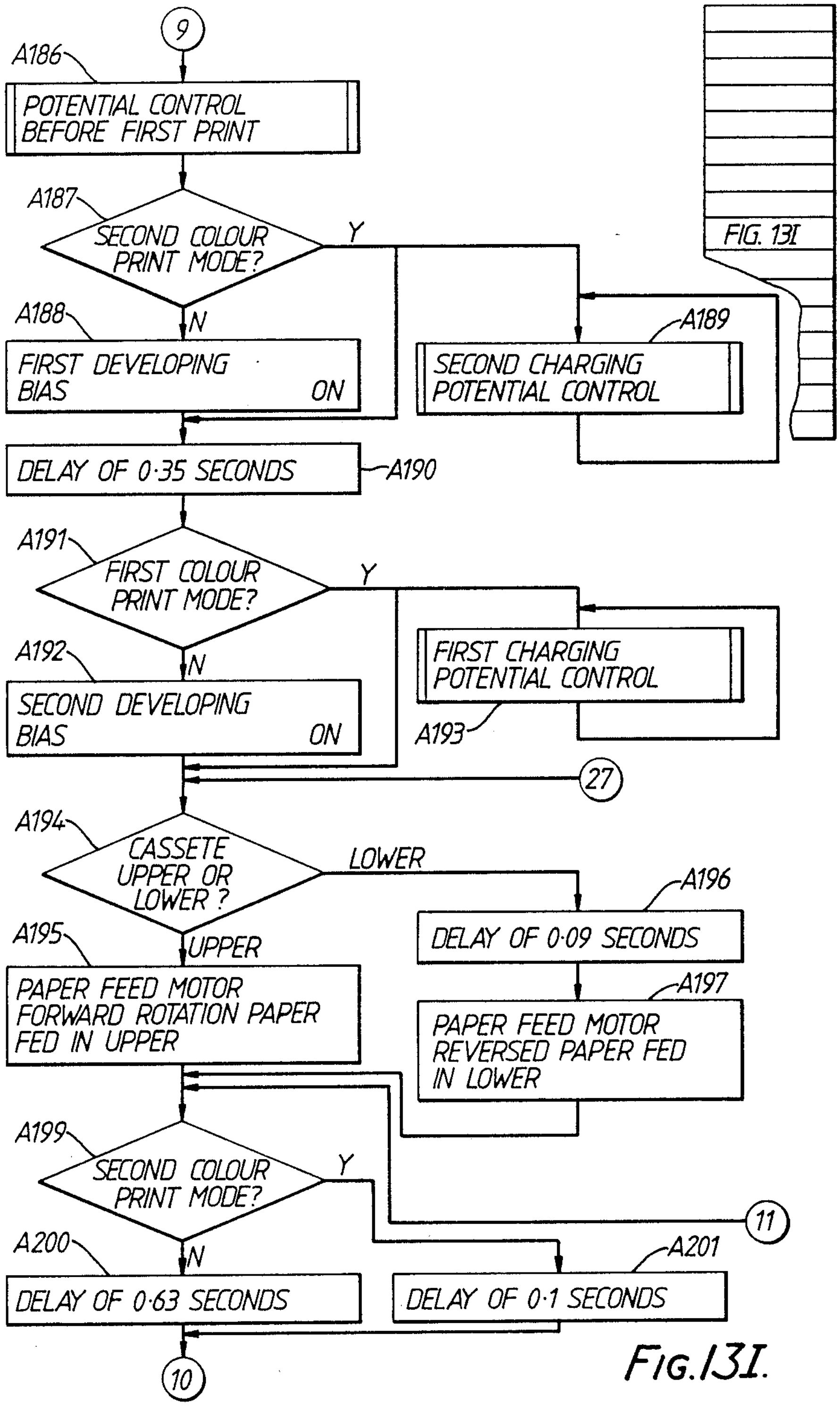
Figure 13J:
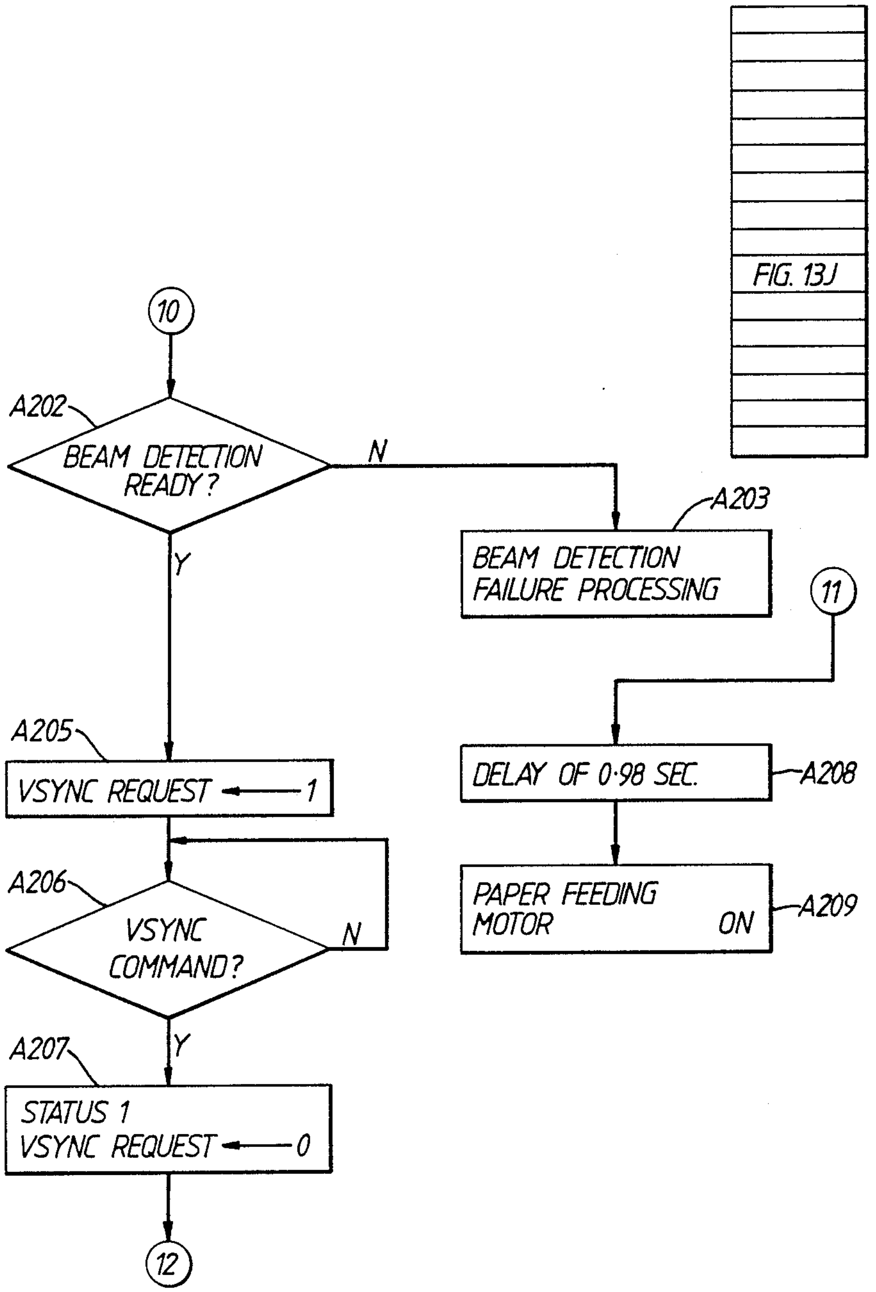
Figure 13K:
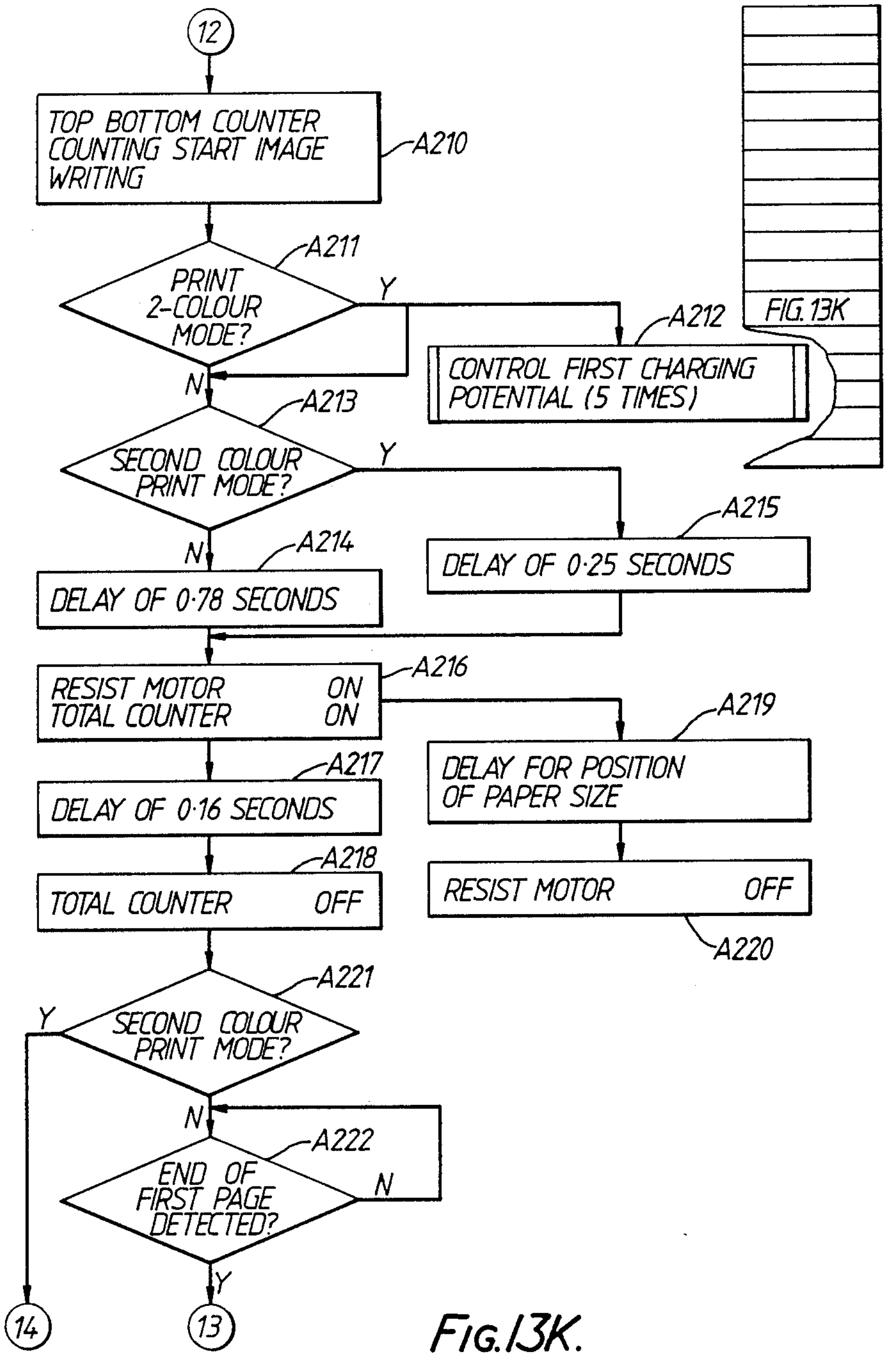
Figure 13L:
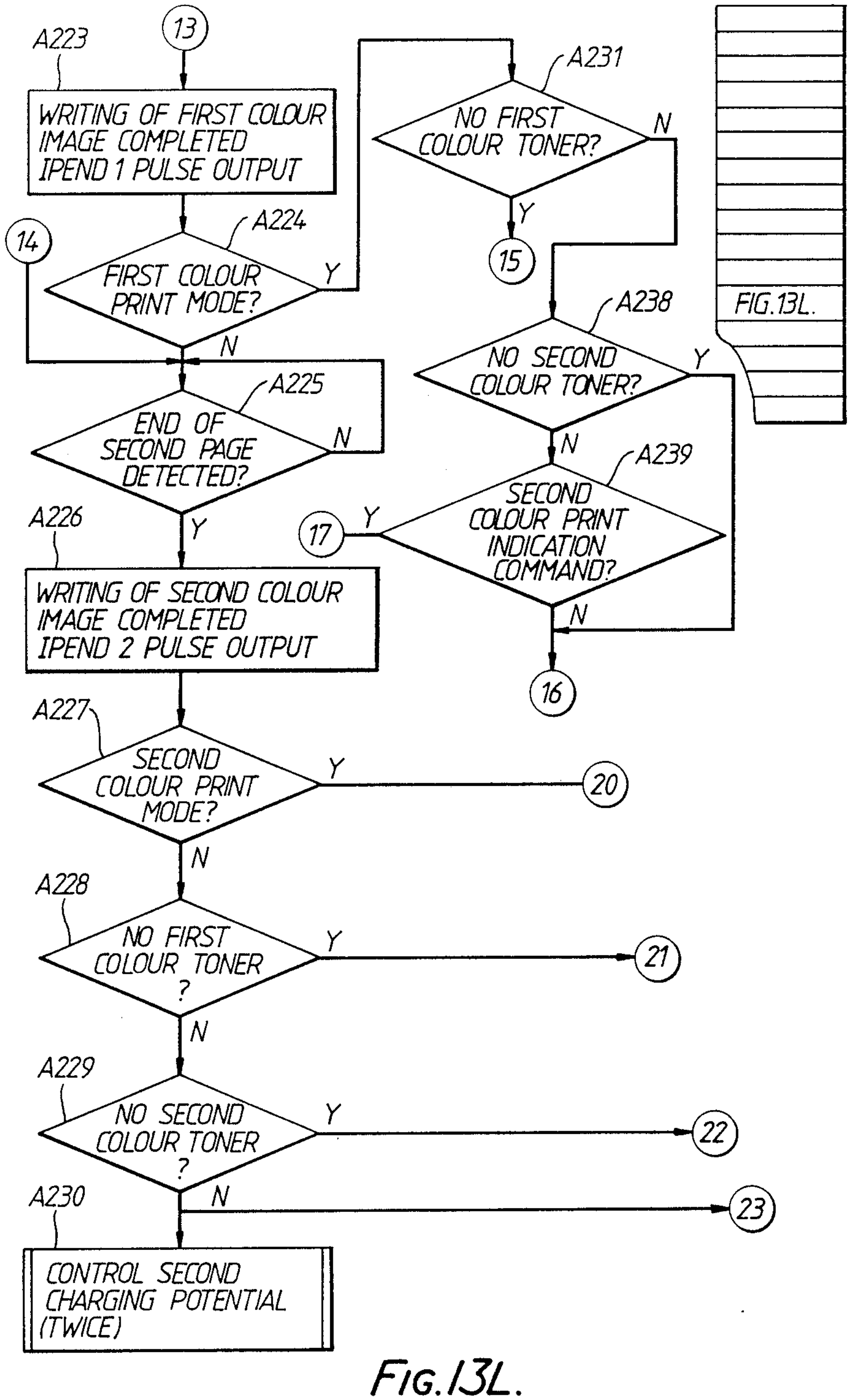
Figure 13M:
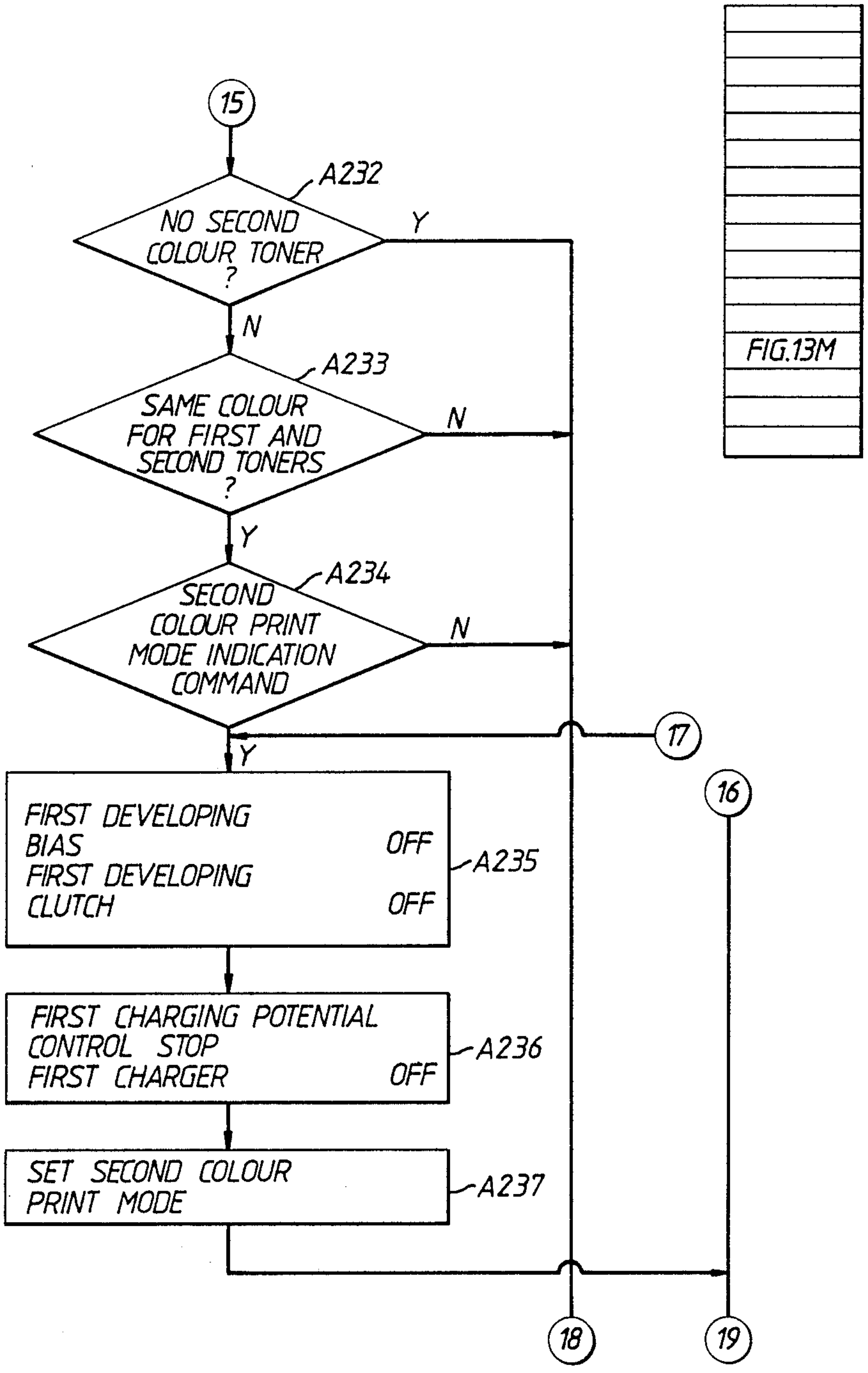
Figure 13N:
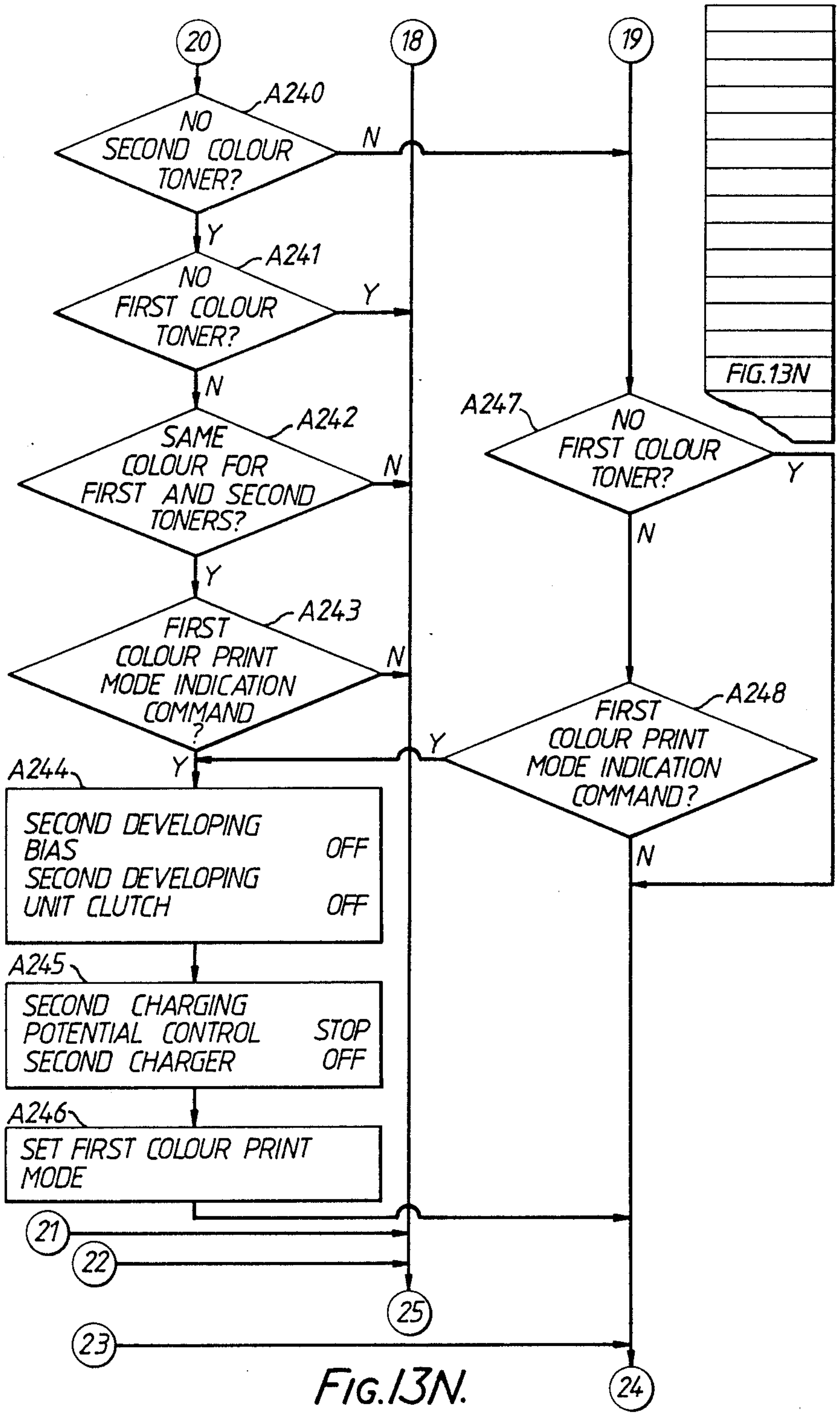

FIG. 13E and 13F show the output process of the print request for host system 500 when the states of each section of two-color image laser beam printer 199 are reported and correct judgements are received on the states of each section from host system 500. First, in Step A142, it is judged whether or not to replace the toner bag for toner recovery. If replacement is necessary (Step A142-"YES"), after waiting for toner bag replacement (Step A146), on replacement completion (Steps A146-"YES", A147) the process proceeds to Step A143. In Step A143, it is judged by the condition of the empty switch of first developing unit 203 whether or not there is no first color toner. If there is no first color toner (Step A143-"YES"), it is confirmed whether or not the printer is in the second color print mode (Step A148). If it is in the first color print mode or in the two-color image print mode (Step A148-"NO"), the process proceeds to Step A144 after completion of supplying of the first color toner to first developing unit 203 (Steps A149-"YES", A150). If it is in the second color print mode (Step A148-"YES"), the process proceeds to Step A144 by skipping Steps A149 and A150. In Step A144, it is judged by the state of the empty switch of second color developing unit 206 whether or not there is no second color toner. If there is no second color toner (Step A144-"YES"), it is confirmed whether or not the printer is in the first color print mode (Step A151). If it is in the second color print mode or in the two-color image print mode (Step A151-"NO"), the process proceeds to Step A145 after completion of supplying of the second color toner to second developing unit 206 (Steps A152-"YES", A153). If it is in the first color print mode (Step A151-"YES"), the process proceeds to Step A145 by skipping Steps A152 and A153.

In this way, if there is no abnormality in the conditions of the toners of first developing unit 203 and second developing unit 206, permission to receive a command from host system 500 is output (Step A145). Here, if there is a command which designates the first color print mode (Step A154-"YES"), the setting of the first color print mode is run (Step A157), or if there is a command which designates the second color print mode (Step A155-"YES"), the setting of the second color print mode is run (Step A158). Furthermore, if there is a command which designates the two-color image print mode (Step A156-"YES"), the setting of the two-color image print mode is run (Step A159). Then, in the following Step A160, when the process which turns on IPRDY and IPREQ is executed, the judgement is made in Step A161 whether or not IPRNT has is in the on-state. If IPRNT remains in the off-state (Step A161-"NO"), the process returns to Step A142. If IPRNT is in the on-state (Step A161-"YES"), after the completion of receiving a print request (Step A162), the process proceeds to the print process following the routine shown in FIG. 13C.

In FIGS. 13G–13J, the processes in Steps A163–A176 are executed in the same way as in the routine for the warming-up processes. In Step A163 the blade solenoid is switched ON. Passing through a delay process (Step A164), the drum motor, the developer motor and discharging lamp 212 are respectively switched ON (Step A165). Passing through a delay process (Step A166), the first laser unit, the second laser unit and the laser test are respectively switched ON (Step A167). After the following delay process (Step A168), breakdown judgements are made by monitors on the first laser unit and the second laser unit (Steps A169 and A170). If they are correct (Step A169-"YES", Step A170-"YES"), the laser test is switched OFF (Step A171) and transfer charger 209 is switched ON (Step A172). If the first laser unit has broken down (Step A169-"NO"), the first laser breakdown process is executed (Step A175), and if the second laser unit has broken down (Step A170-"NO"), the second laser breakdown process is executed (Step A176). After the following a delay process (Step A173), the fixing unit motor and separation charger 210 are respectively switched ON (Step A174), and the process proceeds to Step A177.

In Step A177, it is confirmed whether or not the printer is in the second color print mode, and if it is not in the second color print mode (Step A177-"NO") the clutch of first developing unit 203 is switched ON and first developing unit 203 is driven (Step A178), and the process proceeds to Step A179. If it is in the second color print mode (Step A177-"YES"), the process proceeds to Step A179 by skipping Step A178. In Step A179, it is confirmed whether or not the printer is in the first color print mode, and if it is not in the first color print mode (Step A179-"NO") the clutch of second developing unit 206 is switched ON and second developing unit 206 is driven (Step A180), and the process proceeds to Step A181. If it is in the first color print mode (Step A179-"YES"), the process proceeds to Step A181 by skipping Step A180. In Step A181, developing bias table data on the toner color of first developing unit 203 is read out from ROM 503, and in the following Step A182, the developing bias data which has been read out is set in D/A converter 578. In the following Step A183, developing bias table data on the toner color of second developing unit 206 is read out from ROM 503, and in the following Step A184, the developing bias data which has been read out is set in D/A converter 584.

Figure 16:
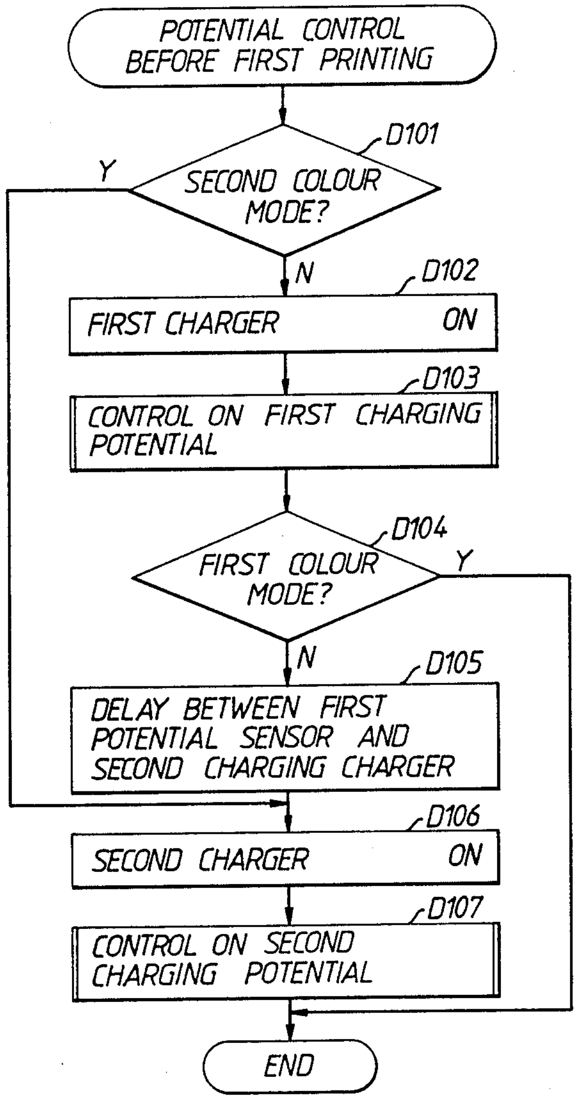
Figure 17A:
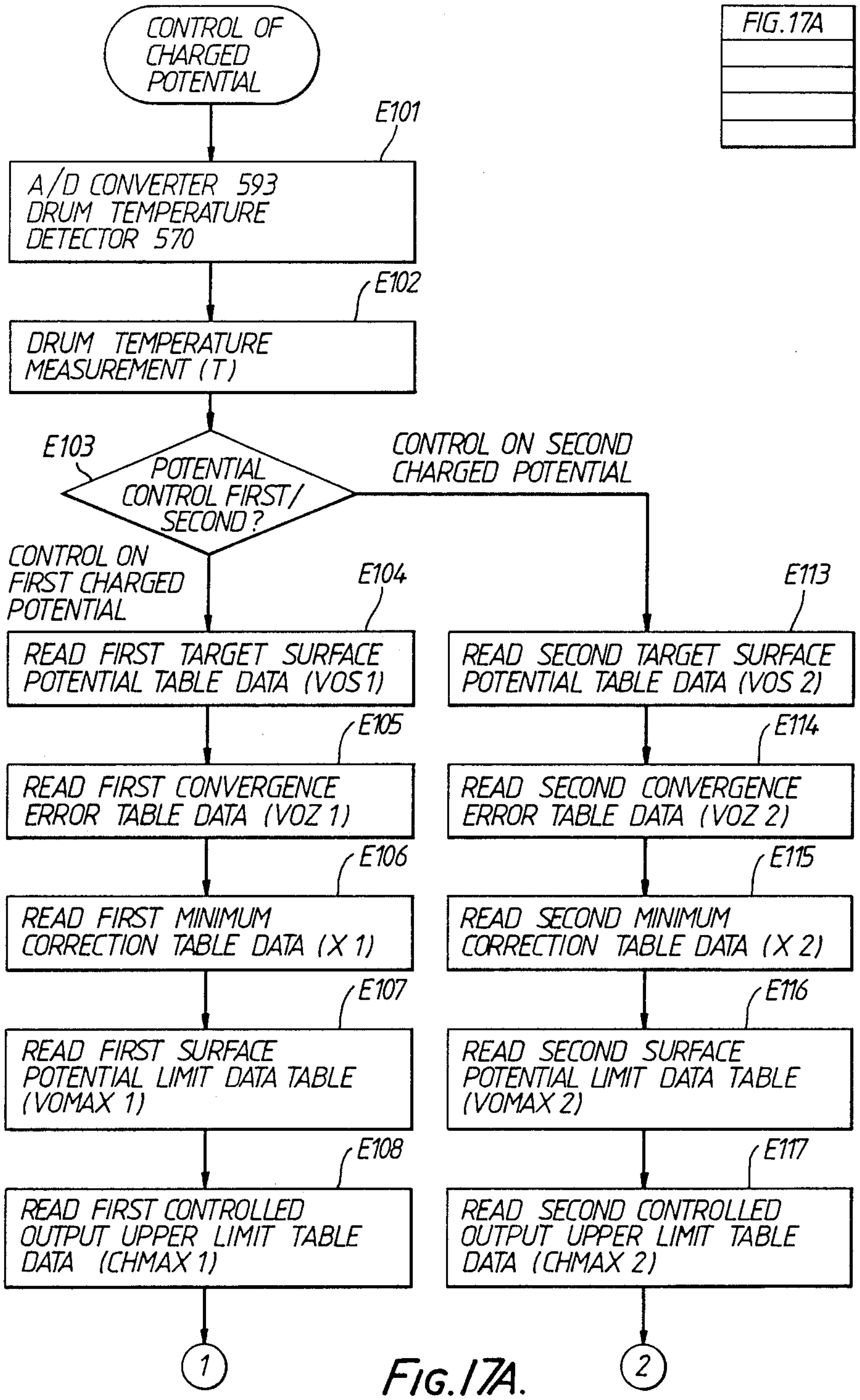
FIGS. 17A–17E are flow-charts showing the sub-routine for charging potential control.
Figure 17B:
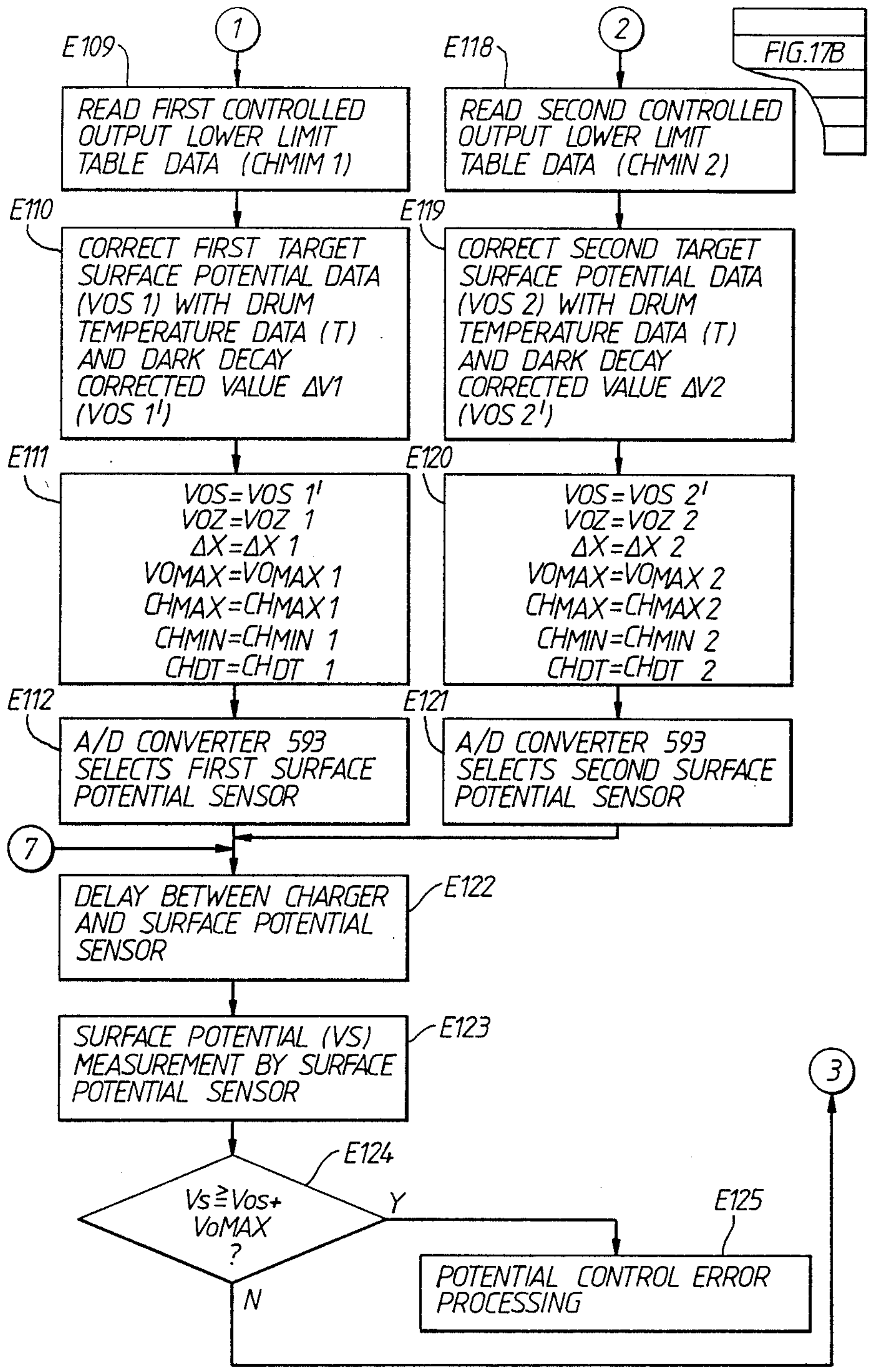
Figure 17C:
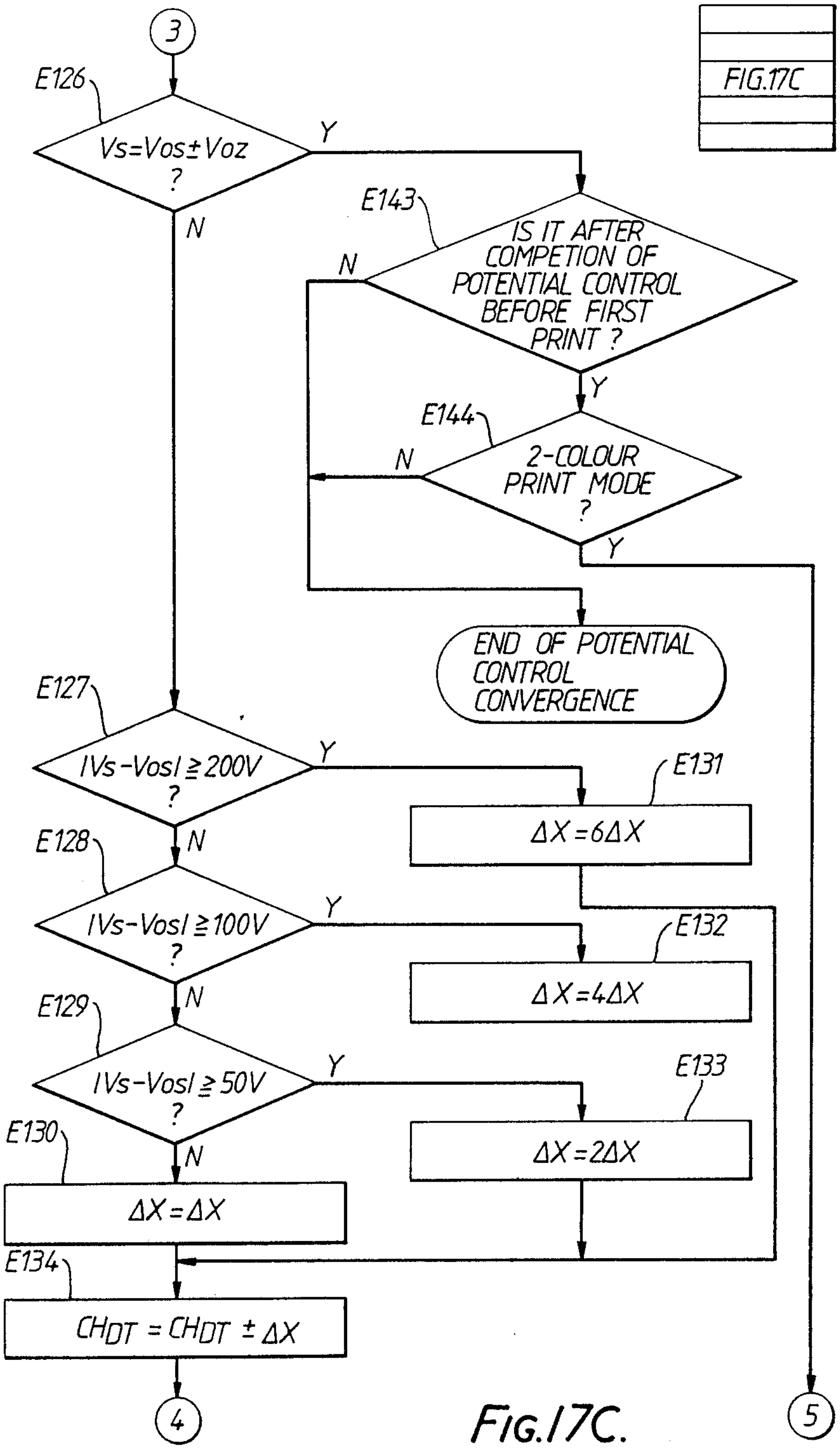
Figure 17D:
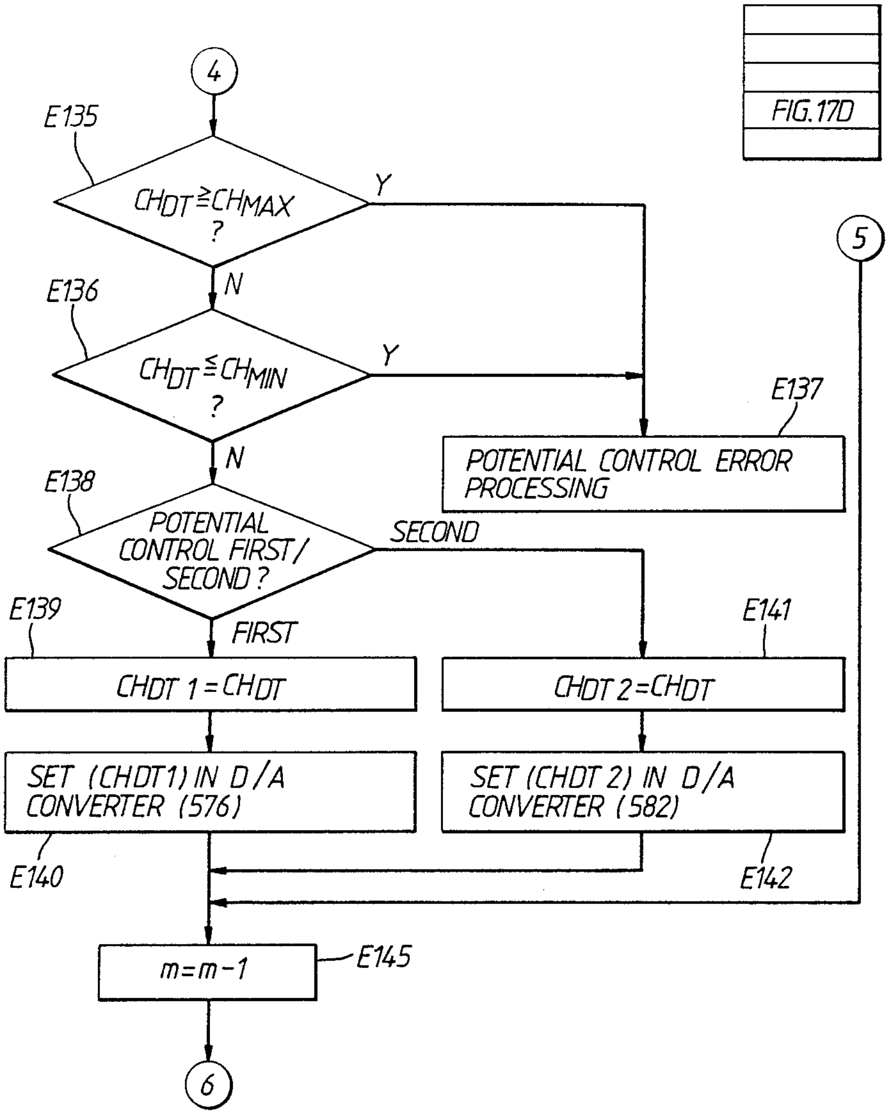
Figure 17E:
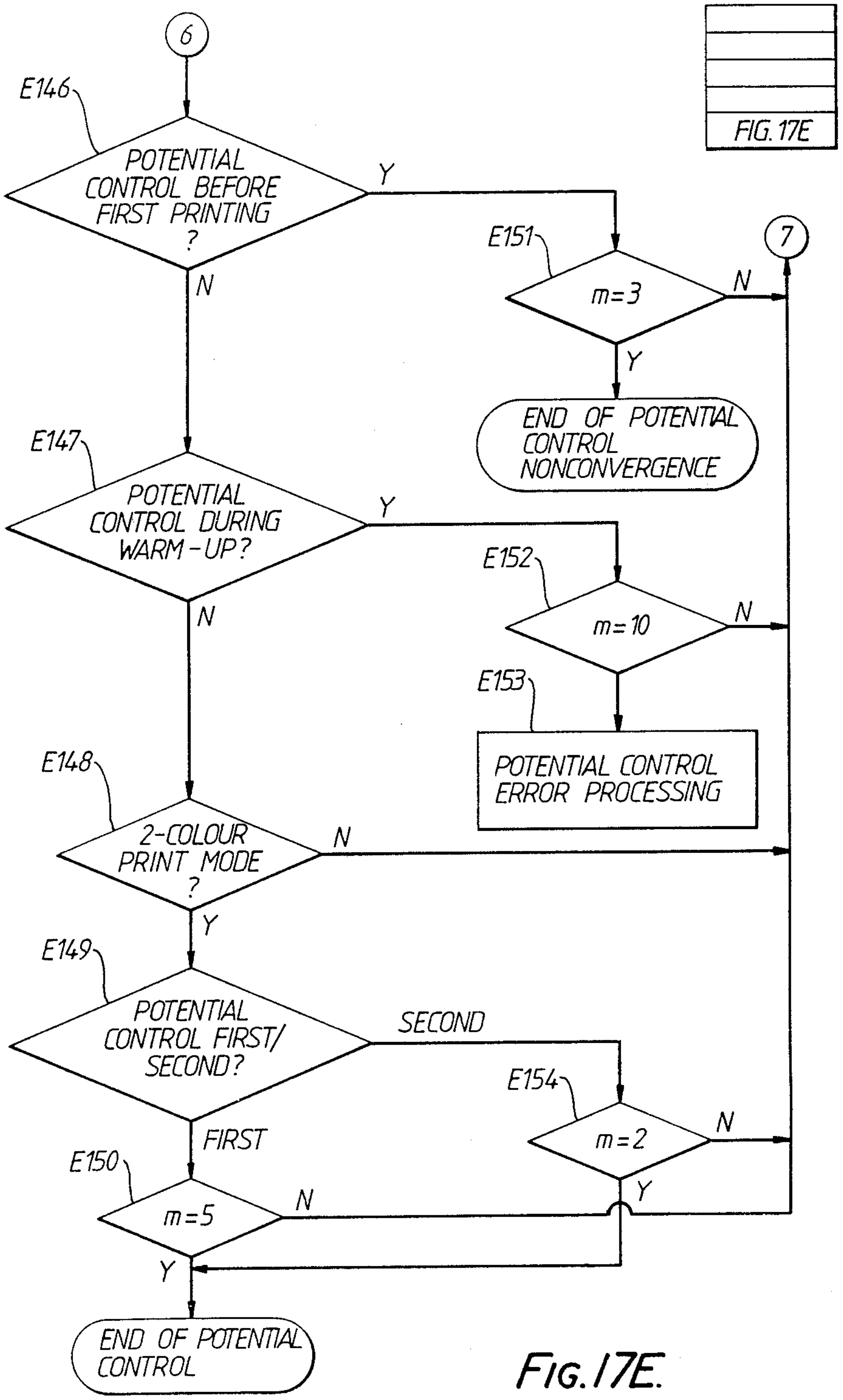

After a delay process which follows (Step A185), the pre-first print potential control, as shown in FIG. 16, is executed (Step A186). In the following Step A187, it is confirmed whether or not the printer is in the second color print mode, and if it is not in the second color print mode (Step A187-"NO"), high-voltage power source 577 for first developing bias is switched ON (Step A188), and the process proceeds to Step A190. If it is in the second color print mode (Step A187-"YES"), the process proceeds to Step A190 by skipping Step A188 and, at the same time, the second charging potential control shown in FIG. 17 is executed (Step A189). In Step A191 which follows a delay process of Step A190, it is confirmed whether or not the printer is in the first color print mode, and if it is not in the first color print mode (Step A191-"NO"), high-voltage power source 583 for second developing bias is switched ON (Step A192), and the process proceeds to Step A194. If it is in the first color print mode (Step A191-"YES"), the process proceeds to Step A140 by skipping Step A192 and, at the same time, the first charging potential control shown in FIG. 17 is executed (Step A193).

In Step A194, it is judged whether the paper supply cassette is in the upper position or the lower position. If it is in the upper position, paper supply is carried out from the upper paper supply cassette by driving the paper supply motor forwards (Step A195). Then, at the same time as proceeding to Step A199, the paper supply motor is switched OFF (Step A209) after a delay process of Step A208. If it is in the lower position, Step A195 is skipped and paper supply is carried out from the lower paper supply cassette by driving the paper supply motor in reverse (Step A197) after a delay process of Step A196. Then, at the same time as proceeding to Step A199, the paper supply motor is switched OFF (Step A209) after a delay process of Step A208. In Step A199, it is confirmed whether or not the printer is in the second color image print mode, and if it is not in the second color image print mode (Step A199-"NO"), the process proceeds to Step A202 after a delay process of Step A200. If it is in the second color image print mode (Step A199-"YES"), the process proceeds to Step A202 after a delay process of Step A201.

In Step A202, the beam detection ready is checked by horizontal synchronization signal HSYNC, and the process proceeds to Step A205. If the beam detection is not found ready by horizontal synchronization signal HSYNC (Step A202-NO), the beam detection breakdown process is executed (Step A203). In step A205, the VSYNC (the command which designates the start of print data transmission from host system 500) request is set, and VSYNC command waiting is run (Step A206). When the VSYNC command is transmitted from host system 500, the VSYNC request is reset (Step A207).

In the following Step A210 of FIGS. 13K–13N, the count of the top and bottom counter starts and image writing starts, and then it is checked whether or not it is in the two-color image print mode (Step A211). If it is not in the two-color image print mode (Step A211-"NO"), the process proceeds to Step A213, and if it is in the two-color image print mode (Step A211-"YES"), it proceeds to Step A213 and, at the same time, the first charging potential control as shown in FIGS. 17A-17E are repeated five times (Step A212). In the following Step A213, it is checked whether or not the printer is in the second color print mode, and if it is not in the second color print mode (Step A213-"NO"), the process proceeds to Step A216 after a delay process of Step A214. If it is in the second color print mode (Step A213-"YES"), the process proceeds to Step A216 after a delay process of Step A215. In Step A216, the resist motor and the total counter are switched ON and then, passing through a delay process (Step A217), the total counter is switched OFF (Step A218). Then the process proceeds to Step A221 and, at the same time, the resist motor is switched OFF (Step A220) after a delay process for the period corresponding the paper size (Step A219).

In Step A221, it is rechecked whether or not the printer is in the second color print mode. If it is not in the second color print mode (Step A221-"NO"), when the first page end is detected (Step A222-"YES"), first color image writing end is run and an IPEND1 pulse is output (Step A223). At this stage, if the printer is in the first color print mode (Step A224-"YES") and when there is first color toner in first developing unit 203 (Step A231-"NO"), if there is a first color print mode designation command (Step A248-"YES") after the judgements of Step A238→Step A239→Step A247, high-voltage power source 583 for second developing bias and the clutch of second developing unit 206 are both switched OFF (Step A244). After this, the second charging potential control is stopped and, at the same time, second charger 204 is switched OFF (Step A245). The first color print mode is set (Step A246), and print request IPREQ is switched ON, as shown in FIG. 13E (Step A249).

At this stage, when there is no first color toner in first developing unit 203 (Step A231-"YES") and there is no second color toner in second developing unit 206 (Step A232-"YES"), print ready IPRDY is switched OFF (Step A253), as shown in FIG 13E. Also, even if there is no first color tones in first developing unit 203 (Step A231-"YES") but there is second color toner in second developing unit 206 (Step A232-"NO") and also if both the first color and the second color are the same color (Step A233-"YES"), when the second color print mode command is output (Step A234-"YES"), high-voltage power source 577 for first developing bias and the clutch of first developing unit 203 are both switched OFF (Step A235). After this, the first charging potential control is stopped and, at the same time, first charger 201 is switched OFF (Step A236). The second color print mode is set (Step A237), and then, after passing through the judgements of Step A247 and Step A248 or the judgement of Step A247, print request IPREQ is switched ON (Step A249), as shown in FIG. 13E.

Figure 13O:
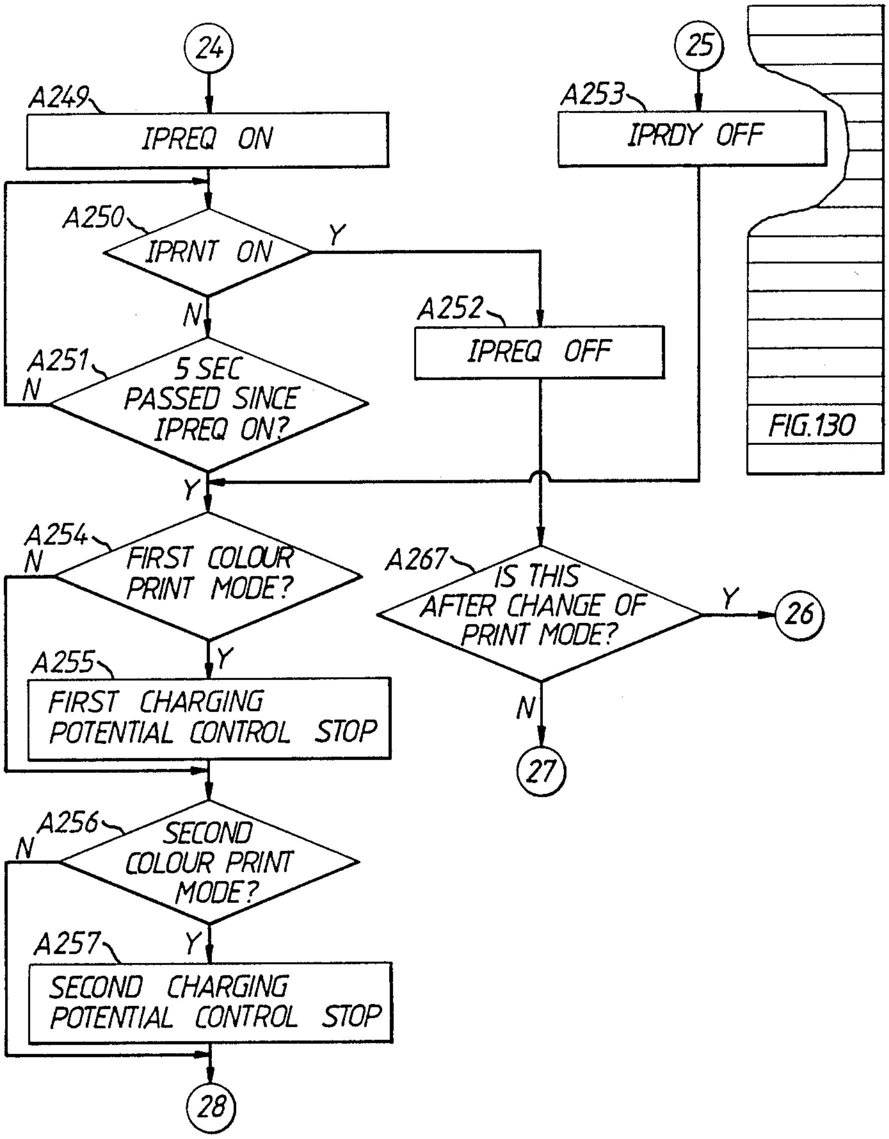

As opposed to this, in Step A224, when the printer is in the first color print mode and there is first color toner in first developing unit 203 (Step A231-"NO") and there is second color toner in second developing unit 206 (Step A238-"NO"), if there is a second color print mode designation command (Step A239-"YES"), high-voltage power source 577 for first developing bias and the clutch of first developing unit 203 are both switched OFF (Step A235). After this, the first charging potential control is stopped and, at the same time, first charger 201 is switched OFF (Step A236). The second color print mode is set (Step A237) and then, after passing through the judgements of Step A247 and Step A248 or the judgement of Step A247, print request IPREQ is switched ON (Step A249), as shown in FIGS. 13O-13P.

On the other hand, when it is judged in Step A221 that the printer is in the second color print mode or when it is judged in Step A224 that it is not in the first color print mode and when the second page end has been detected (Step A225), the second color image writing end is run and the IPEND2 pulse is output (Step A226). At this time, if the printer is in the second color print mode (Step A227-"YES"), even if there is no second color toner in second developing unit 206 (Step A240-"YES") but there is first color toner in first developing unit 203 (Step A241-"NO") and also if both the first color and the second color are the same color (Step A242-"YES"), when the first color print mode designation command is output (Step A243-"YES"), second developing bias high-voltage power source 583 and the clutch of second developing unit 206 are both switched OFF (Step A244). After this, the second charging potential control is stopped and, t the same time, second charger 204 is switched OFF (Step A245). The first color print mode is set (Step A246), and then print request IPREQ is switched ON (Step A249), as shown in FIGS 130 and 13P.

In Step A227, if the printer is not in the second color print mode, it is judged whether or not there is no first color toner in first developing unit 203 (Step A228), and then it is judged whether or not there is no second color toner in second developing unit 206 (Step A229). If there is no toner in Steps A228 and A229, print ready IPRDY is switched OFF (Step A253), as shown in FIG. 13E. If there is toner in Steps A228 and A229, the process proceeds to Step A249 and, at the same time, the second charging potential control is carried out twice, as shown in FIG. 17 (Step A230).

In FIGS. 130 and 13P, after the print request IPREQ switching ON process of Step A249, it is judged whether or not print start signal IPRNT has been switched ON (Step A250). If it has not been switched ON (Step A250-"NO"), it is judged whether or not 5 seconds has elapsed since print request IPREQ was switched ON (Step A251), and if 5 seconds has not elapsed (Step A251-"NO") the process returns to Step A250. In Step A250, if print start signal IPRNT has been switched ON, print request IPREQ is switched OFF (Step A252) and then it is judged whether or not the print mode has been changed (Step A267). If the print mode has changed (Step A267-"YES"), the process returns to Step A177 and puts first developing unit 203 or second developing unit 206 into the developing enabled state in Steps A177-A193. When the print mode has not changed (Step A267-"NO"), the process returns to Step A194 and the processes in Steps A177-A193 are omitted. However, in either case of the printing mode, since the process is repeated without carrying out the processes in Steps A101-A176, the recording operation continues without carrying out the temporary stopping of two-color image laser beam printer 199.

As opposed to this, if 5 seconds has elapsed in Step A251, after the stop processes of Steps A254-A266 the process returns to Step A142, and enters a stand-by state of waiting for a command from host system 500. Also, when print ready IPRDY is switched OFF by Step A253, since the print operation is not required, after the stop processes of Steps A254–A266, the process returns to Step A142 and enters the stand-by state of waiting for a command from host system 500.

FIG. 14 is a flow-chart showing the potential control during warming-up. For potential control during warming-up, first, value CHDT1 of the first charging first control output is read from the table data of ROM 503 (Step B101) and the value CHDT1 which is read out is set in D/A converter 576 (Step B102). Also, the second charging first control output value CHDT2 is read from the table data of ROM 503 (Step B103) and the value CHDT2 which is read out is set in D/A converter 582 (Step B104). Next, the dark decay characteristic measurement of the photosensitive body is executed, as shown in FIG. 15 (Step B105) and then the first charging potential control shown in FIG. 17 is executed (Step B106). After the following delay process (Step B107), the second charging potential control shown in FIGS. 17A–17E are executed (Step B108). Then, the number of times of potential control n is stepped on (Step B109) and Steps B106–B110 are repeated until the number of times of potential control n reaches 3 times. When 3 times have been carried out, first charger 201 and second charger 204 are switched OFF (Step B111) and potential control during warming-up is completed.

Figure 15A:
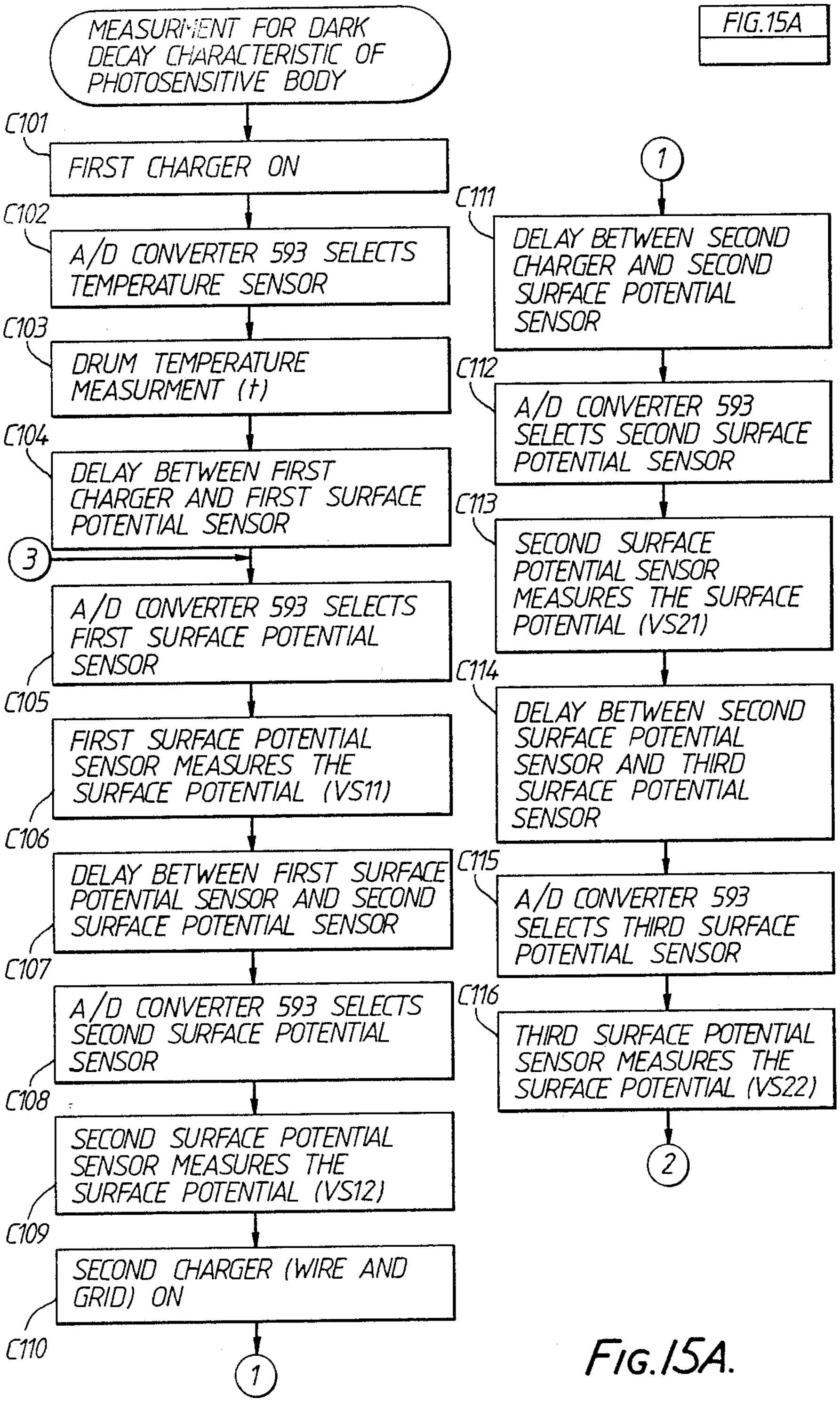
FIGS. 15A and 15B are flow-charts showing the sub-routine for measuring the dark decay characteristic of the photosensitive body.
Figure 15B:
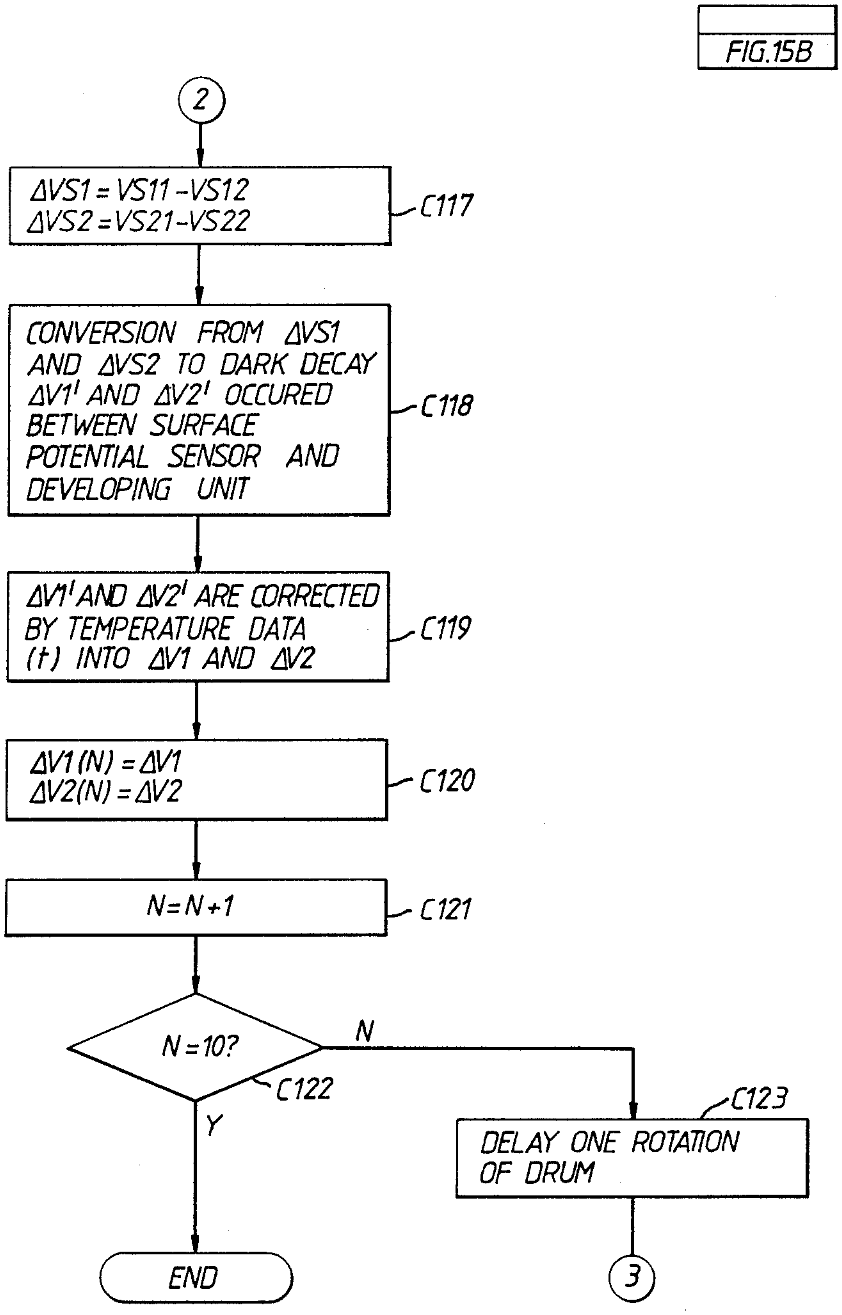

FIGS. 15A and 15B are flow-charts showing the dark decay characteristic measurement of the photosensitive body. First charger 201 is switched ON (Step C101), temperature sensor 570 is selected by A/D converter 593 (Step C102) and the temperature measurement of photosensitive body 200 is carried out (Step C103). Next, there is a delay from first charger 201 to first surface potential sensor 202 (Step C104). When the charged point of photosensitive body 200 has advanced to a position directly under, or beyond directly under, first surface potential sensor 202, first surface potential sensor 202 is selected by A/D converter 593 (Step C105), the measurement of the surface potential of photosensitive body 200 is carried out by first surface potential sensor 202 (Step C106) and the measured value is taken as VS11. Next, there is a delay from first surface potential sensor 202 to second surface potential sensor 205 (Step C107). When the point measured by first surface potential sensor 202 reaches the vicinity of second surface potential sensor 205, second surface potential sensor 205 is selected by A/D converter 593 (Step C108), the measurement of the surface potential of photosensitive body 200 is carried out by second surface potential sensor 205 (Step C109) and the measured value is taken as VS12.

Next, second charger 204 is switched ON (Step C110). Then there is a delay from second charger 204 to second surface potential sensor 205 (Step C111). When the charged point of photosensitive body 200 has advanced to a position directly under, or beyond directly under, second surface potential sensor 205, second surface potential sensor 205 is selected by A/D converter 593 (Step C112), the measurement of the surface potential of photosensitive body 200 is carried out by second surface potential sensor 205 (Step C113) and the measured value is taken as VS21. Next, there is a delay from second surface potential sensor 205 to third surface potential sensor 208 (Step C114). When the point measured by second surface potential sensor 205 reaches the vicinity of third surface potential sensor 208, third surface potential sensor 208 is selected by A/D converter 593 (Step C115), the measurement of the surface potential of photosensitive body 200 is carried out by third surface potential sensor 208 (Step C116) and the measured value is taken as VS22.

First, the dark decay value ΔVS1 of photosensitive body 200 from first surface potential sensor 202 to second surface potential sensor 205 is obtained by computation from the measured values VS11 and VS12 obtained in the above way. At the same time, the dark decay value ΔVS2 of photosensitive body 200 from second surface potential sensor 205 to third surface potential sensor 208 is also obtained by computation from the measured values VS21 and VS22 obtained in the same way (Step C117). Next, the relationship between the transfer distance and the dark decay of photosensitive body 200 is obtained from this value ΔVS1. Since the transfer distance between VS11 and VS12 is short, the relationship between the dark decay and the transfer distance can be regarded as a proportional relationship, and the dark decay value at the developing position can be obtained by computation. Next, the dark decay value of the first color is taken as ΔV1' and the dark decay value of the second color is taken as ΔV2' (Step C118). Since these dark decay values ΔV1' and ΔV2' depend on the photosensitive body temperature at the time of measurement, they are corrected using the temperature data measured previously, and then are taken as the dark decay values ΔV1 and ΔV2 based on the reference temperature (Step C119). By this means the dark decay corrected values ΔV1 and ΔV2 of the charging potential control shown in FIGS. 17A–17E are obtained.

Moreover, for photosensitive body 200, since the dark decay value changes from moment to moment during initial fatigue, and sampling of data is required during this period of greater change, the taking of 10 samples of data is carried out in this embodiment (Steps C120–C123). Consequently, when, in the charging potential control during warming-up, control is carried out so that there is an optimum charging potential for each color when first printing, the dark decay corrected value uses the last data out of the 10 samples of data.

Also, in the charging potential control before first printing and during printing, the initial fatigue of photosensitive body 200 influences the control. Therefore, the dark decay corrected value uses the first data for each color in the control before first printing. Also, the dark decay corrected value successively uses the second data onwards for each color for each successive print in the control during printing, and for the 10th sheet onwards the final sampling data are used for the dark decay corrected value.

FIG. 16 is a flow-chart showing the potential control before first printing. For the potential control before the first printing, first, it is judged whether or not it is in the second color print mode (Step D101). If not in the second color print mode (Step D101-"NO"), first charger 201 is switched ON (Step D102) and the first charging potential control shown in FIG. 17 is executed (Step D103). If it is in the first color print mode only (Step D104-"YES"), the potential control before first printing completes. If the second color print mode is also executed (Step D104-"NO"), after a delay process (Step D105) second charger 204 is switched ON (Step D106) and the second charging potential control shown in FIGS. 17A–17E are executed (Step D107) and the potential control before first printing completes. On the other hand, if it is in the second color print mode in Step D101, only the second color print mode is executed. Therefore, second charger 204 is switched ON (Step D106), the second charging potential control shown in FIG. 17 is executed (Step D107) and the potential control before first printing completes.

FIGS. 17A–17F are flow-charts showing the charging potential control. First, temperature sensor 570 is selected by A/D converter 593 (Step E101). When the temperature measurement of photosensitive body 200 has been carried out (Step E102), either the first charging potential control or the second charging potential control is selected (Step E103). In the case of the first charging potential control each of the processes in Steps E104–E109 is executed based on the data table of ROM 503. Also, in the case of the second charging potential control each of the processes in Steps E113–E118 is executed. Then in Steps E110 and E119, the first target surface potential data (VOS1) and the second target surface potential data (VOS2) are respectively corrected by previously measured temperature data (T) and dark decay corrected values (ΔV1 and ΔV2) so that they correspond to the actual temperature of photosensitive body 200, and the respective correction data VOS1' and VOS2' corresponding to these are obtained. In the following Steps E112 and E120, in order to store each value obtained in Steps E104–E110 and each value obtained in Steps E113–E119 together in a common register, computation processes, as shown in Steps E111 and E120, are executed. In the following Steps E112 and E121, first surface potential sensor 202 and second surface potential sensor 205 are respectively selected by A/D converter 593.

Next, Steps E122 onwards are executed in the cases of both the first charging potential control and the second charging potential control. First, a delay process for a time component equivalent to the operation distance between first and second chargers 201 and 204 and first and second surface potential sensors 202 and 205 is executed (Step E122). The surface potential VS is measured by first and second surface potential sensors 202 and 205 (Step E123). In the following Steps E124 onwards, processes based on the various data shown in Steps E111 and E120 are carried out. In Step E124, it is judged whether or not the value read is equal to or greater than [VOS+VOMAX] according to the arithmetical expression $$VS \geqq VOS+VOMAX$$

If the value is equal or greater (Step E124-"YES"), the potential control error process is executed (step E125). If it is less (Step E124-"NO"), the process proceeds to Step E126. In Step E126, it is judged whether or not the value read agrees with the target value within the control range of the error table in accordance with the arithmetical expression $$VS=VOS\pm VOZ$$

If it does not agree (Step E126-"NO"), it is successively judged by how much it differs from the target value, for instance 200V, 100V, 50V (Steps E127, E128 and E129), and processes of setting the control amount the same as X or 2 times, 4 times or 6 times greater are executed (Steps E130, E131, E132 and E133).

After this setting process, the process proceeds to Step E134 and the charging output is set. In Step E135, it is judged whether or not this charging output is greater than the maximum value, and in Step E136 it is judged whether or not the charging output is smaller than the minimum value. If it is greater or smaller (Steps E135 and E136-"YES"), the potential control error process is executed (Step E137). On the other hand, if the charging output is within the control range (Steps E135 and E136-"NO"), the process proceeds to Step E138 and it is judged which of first charger 201 and second charger 204 is the actual object of potential control. If the result of this judgement is first charger 201 after setting

CHDT1=CHDT (Step E139), [CHDT1] is set in D/A converter 576 (Step E140) and the process proceeds to Step E145. Also, if the result of the above judgment is second charger 204, after setting

CHDT2=CHDT (Step E141), [CHDT2] is set in D/A converter 582 (Step E142) and the process proceeds to Step E145.

In Step E145, the number of times of charging potential control is incremented on and the process proceeds to the routine in Steps E146 onwards. If it is pre-first print potential control (Step E146-"YES"), when the number of times m of potential control is 3 times (step E151-"YES"), non-convergence due to potential control completes, and if it is 2 times or less (Step E151-"NO"), the process returns to Step E122. Also, if it is the potential control in the warming up period, (Step E147-"YES"), when the number of times m of potential control is 10 times (Step E152"YES"), the potential control error process is executed (Step E153), and if it is 9 times or less (Step E152-"NO"), the process returns to Step E122. Furthermore, if it is not in the two-color image print mode (Step E148-"NO"), the process returns to Step E122, but if it is in the two-color image print mode (Step E148-"YES"), it is judged which of first charger 201 and second charger 204 is the actual object of potential control (Step E149). If the result of this judgement is first charger 201, when potential control has been carried out 5 times (Step E150-"YES"), potential control is completed, but if it is up to 4 times (Step E150-"NO"), the process returns to Step E122. Also, if the result of this judgement is second charger 204, when potential control has been carried out 2 times (Step E154-"YES"), potential control is completed, but if it is up to 1 time (Step E154-"NO"), the process returns to Step E122.

If the two-color image laser beam printer explained above is used, the surface potential at the developing position can always be maintained constant regardless of individual differences of photosensitive bodies and high-quality stable printed images can be obtained by carrying out the following. The surface potentials of the photosensitive body are measured at two different positions with a development process between them, and the surface potential of the photosensitive body at the developing position is estimated based on these measured surface potentials. Then charging potential control is carried out, so that this surface potential of the photosensitive body estimated for the developing position becomes the target surface potential. Moreover, even if the dark decay characteristic differs due to individual differences of photosensitive bodies, no particular external adjustment nor dark decay characteristic data is required. Furthermore, the temperature of the photosensitive body is also measured at the same time, and since it also corresponds to the characteristic variation due to the temperature of the photosensitive body, a correction for charged potential reduction between the surface potential sensor and the developing position can always be made by the most suitable correction method, the surface potential at the developing position is made more stable and high-quality printed images can be obtained. Also, when the photosensitive body is replaced, the conventional adjustment which was due to individual differences of photosensitive bodies is not required. Thus, replacement of the photosensitive body can be carried out very simply.

Incidentally, in the above embodiment, linear approximation was carried out for the estimation of the surface potential of the photosensitive body at the developing position from the measured surface potential of the photosensitive body, but an approximation method using a high order curve is effective for carrying this out more accurately.

Moreover, in the above embodiment, the case of the application of the present invention to a two-color image laser beam printer has been explained. However, the invention is not limited to this. For instance, it may also be used for a single-color image laser beam printer. In short, if the recording system includes the processes of forming a latent image on a charged photosensitive body and then developing this formed latent image, the present invention can be applied.

What is claimed is:

1. A recording apparatus including a photosensitive body, means for charging the photosensitive body, means for forming a latent image on the photosensitive body charged by the charging means, and means for developing the latent image into a visible image on the photosensitive body, the photosensitive body having a surface which is movable to successively pass the charging means, the latent image forming means and developing means, the apparatus comprising:

first measuring means for measuring the surface potential of the photosensitive body at a position before the developing means;

second measuring means for measuring the surface potential of the photosensitive body at a position after the developing means;

means for estimating an estimated surface potential at the position of the developing means based on the surface potentials measured by the first and second measuring means; and means for controlling the charging means in response to the estimated surface potential, to charge the photosensitive body to a determined level when an image forming operation is performed.

2. The apparatus of claim 1 wherein the photosensitive body includes a photosensitive drum which is rotatable to successively pass the charging means, the first measuring means, the latent image forming means, developing means and the second measuring means.

3. The apparatus of claim 2 wherein the latent image forming means includes a laser beam scanning unit for generating an electrostatic latent image on the photosensitive drum.

4. The apparatus of claim 3 wherein the first measuring means includes a first potential sensor and the second measuring means includes a second potential sensor.

5. A recording apparatus including a photosensitive body, comprising:

first charging means for charging the photosensitive body;

first measuring means for measuring the surface potential of the photosensitive body charged by the first charging means;

first forming means for forming a first latent image on the photosensitive body charged by the first charging means;

first developing means for developing the first latent image into a first visible image on the photosensitive body;

second charging means for charging the photosensitive body formed the first visible image thereon;

second measuring means for measuring the surface potential of the photosensitive body charged by the second charging means;

second forming means for forming a second latent image on the photosensitive body charged by the second charging means;

second developing means for developing the second latent image into a second visible image on the photosensitive body;

third measuring means for measuring the surface potential of the photosensitive body formed the second visible image thereon;

means for estimating a first estimated surface potential at the position of the first developing means in response to the surface potentials measured by the first and second measuring means, and for estimating a second estimated surface potential at the position of the second developing means in response to the surface potentials measurement by the first and second measuring means; and means for controlling each of the first and second charging means in response to said first and second estimated surface potentials, respectively, when an image forming operation is performed.

6. The apparatus of claim 5 wherein the photosensitive body includes a photosensitive drum which is rotatable to successively pass the first charging means, the first measuring means, the first forming means, the first developing means, the second charging means, the second measuring means, the second forming means, the second developing means, and the third measuring means.

7. The apparatus of claim 6 wherein the first developing means includes a first color developer agent and the second developing means includes a second color developer agent.

8. The apparatus of claim 6 wherein each of the first and second forming means includes a laser beam scanning unit for generating an electrostatic latent image on the photosensitive drum.

9. The apparatus of claim 7 wherein the first measuring means includes a first potential sensor, the second measuring means includes a second potential sensor and the third measuring means includes a third potential sensor.

10. A method for controlling the charging on a photosensitive body having a surface on which an image forming operation is performed by the surface successively passing a charging means for charging the photosensitive body, an image forming means for forming a latent image on the photosensitive body charged by the charging means, and developing means for developing the latent image into a visible image on the photosensitive body, the method comprising the steps of:

a. measuring the first value of the surface potential of the photosensitive body charged by the charging means at a position before the developing means;

b. measuring a second value of the surface potential of the photosensitive body at a position after the developing means;

c. estimating the surface potential of the photosensitive body at a position between the first and second measuring based on each surface potential measured by the first and second measuring to obtain an estimated surface potential at the position of the developing means; and d. controlling the charging of the photosensitive body in response to the estimated surface potential when an image forming operation of the surface of the photosensitive body is performed.

11. The method of claim 10 further comprising the step of repeating steps (a–c) a plurality of times and storing the estimated surface potential generated in each repetition of steps (a–c).

12. The apparatus of claim 1 further comprising means for adjusting the estimated surface potential in response to temperature variations of the photosensitive body.

13. The apparatus of claim 5 further comprising means for adjusting the first and second estimated values in response to temperature variations of the photosensitive body.

14. The method of claim 10 further comprising the step of adjusting the estimated surface potential in accordance with the temperature of the photosensitive body.

* * * * *